(12) United States Patent
Yokoi et al.

(10) Patent No.: US 6,764,400 B1
(45) Date of Patent: *Jul. 20, 2004

(54) LCD GAME MACHINE AND ROM CARTRIDGE

(75) Inventors: Gumpei Yokoi, Kyoto (JP); Issey Suga, Kyoto (JP); Kousei Kazeto, Kyoto (JP); Noriyasu Kakuda, Kyoto (JP)

(73) Assignee: Kabushiki Kaisha Bandai, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,477

(22) Filed: Dec. 23, 1997

(30) Foreign Application Priority Data

Dec. 27, 1996 (JP) .............................................. 8-358198
Nov. 11, 1997 (JP) .............................................. 9-327134

(51) Int. Cl.⁷ ................................................ A63F 13/00
(52) U.S. Cl. ............................................ 463/36; 463/1
(58) Field of Search ............................. 463/1–7, 30–34, 463/36–38, 43–47; 345/4, 5, 87

(56) References Cited

U.S. PATENT DOCUMENTS

| | | | | |
|---|---|---|---|---|
| 4,334,679 A | * | 6/1982 | Doyle et al. ..................... | 273/1 |
| 4,359,222 A | * | 11/1982 | Smith, III et al. ............ | 463/31 |
| 4,386,776 A | * | 6/1983 | Bromley ....................... | 273/85 |
| 4,401,304 A | * | 8/1983 | Hamano ......................... | 463/3 |
| 4,415,153 A | * | 11/1983 | Yokoi ........................... | 463/23 |
| 4,424,967 A | * | 1/1984 | Yokoi ........................... | 463/29 |
| 4,438,926 A | * | 3/1984 | Yokoi ........................... | 463/29 |
| 4,504,062 A | * | 3/1985 | Smith ........................... | 463/2 |
| 4,589,659 A | * | 5/1986 | Yokoi et al. .................... | 463/1 |
| 4,969,647 A | | 11/1990 | Mical et al. | |
| 4,992,631 A | * | 2/1991 | Gee ........................... | 200/5 A |
| 5,026,058 A | * | 6/1991 | Bromley ....................... | 273/93 |
| 5,137,277 A | * | 8/1992 | Kitaue ......................... | 273/85 |
| 5,150,899 A | * | 9/1992 | Kitaue ......................... | 463/2 |
| 5,161,803 A | * | 11/1992 | Ohara ......................... | 463/44 |
| 5,184,830 A | | 2/1993 | Okada et al. | |
| 5,276,831 A | | 1/1994 | Nakanishi et al. | |
| 5,435,552 A | * | 7/1995 | Lui ........................ | 273/118 A |
| 5,685,776 A | * | 11/1997 | Stambolic et al. ............ | 463/46 |
| 5,795,227 A | * | 8/1998 | Raviv et al. ................... | 463/34 |

FOREIGN PATENT DOCUMENTS

| | | | | |
|---|---|---|---|---|
| JP | 7-281806 | | 10/1995 | |
| WO | WO 83/02566 | * | 8/1983 | ............. A63F/9/00 |

* cited by examiner

*Primary Examiner*—John M. Hotaling, II
(74) *Attorney, Agent, or Firm*—Luce, Forward, Hamilton & Scripps, LLP

(57) ABSTRACT

A hand-held LCD game machine is combined with a cartridge in which the program datum is memorized. The game machine has a smaller and oblong shape LCD display. When the game is operated in a vertical scrolling manner, the LCD display portion is used lengthwise, while when the operated game is in a horizontal scrolling manner, the LCD display is used sideways. The game is operated by both thumbs of the player's hands, and plural operative key sets and switches are provided in proper positions so that the game machine may be smoothly operated by the player in either a lengthwise or sideways position.

12 Claims, 19 Drawing Sheets

Fig. 22
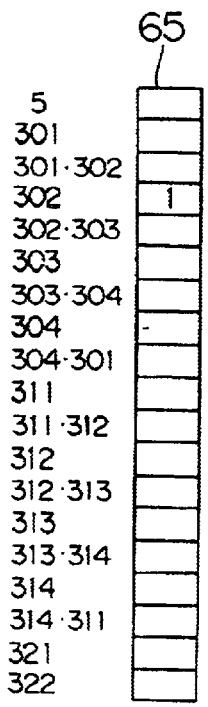
Fig. 23 (a) (Horizontal memory)
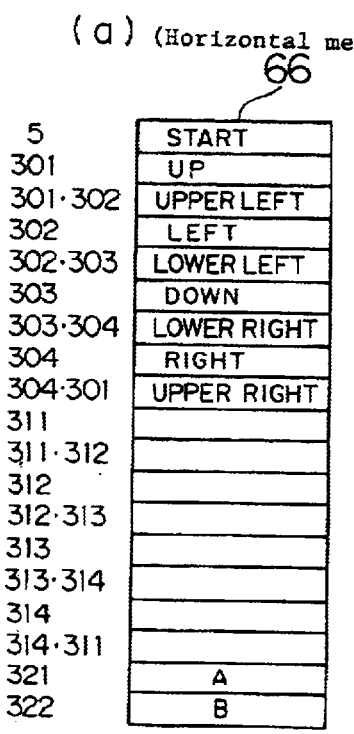
Fig. 23 (b) (Vertical Memory)
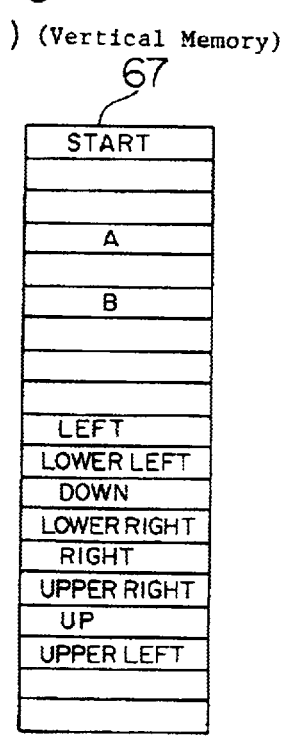

PRIOR ART

LCD GAME MACHINE AND ROM CARTRIDGE

RELATED APPLICATIONS

This present disclosure relates to subject matter contained in Japanese Patent Application No.8-358198 (Filed on Dec. 27, 1996) and Japanese Patent Application No.9-327134 (Filed on Nov. 11, 1997) which are expressly incorporated herein by reference in their entirety.

BACKGROUND OF THE INVENTION

In the prior art, a liquid crystal display (LCD) is adopted for a display portion of a hand-held game machine, and a game is programed to be developed into vertical scrolling or into horizontal scrolling.

With reference to FIG. 27 and FIG. 28, a hand-held game machine in the prior art is presented.

FIG. 27 shows a plan view of a prior art machine. When a cartridge with its memory cell having a memory of a program data is inserted into the machine, game play is started.

FIG. 28 is a side view of the FIG. 27 seen from an arrow A.

With reference to these two figures, a numeral 1 is a game machine. On the center of the machine (1), a LCD display portion (2) is positioned. Where the machine (1) is held by both hands of a player, a cruciform shifting key (3) is formed as a first operative means on the slight lower and left position of the machine and on the left side of the display portion (2) to be operated by a thumb of a left hand (B). This key (3) is established in bulging cruciform toward its center with a round skirt, and the key (3) moves a character of the game in the direction of "Up and Down" and "Left and Right". This key (3) also decides the character of the game after the selection of starting the game. In the symmetrical location opposite the key (3), namely on the right side of the display portion (2), a key set (4) comprising a passive movement key (4a) and a active movement key (4b) is formed as a second operative means to be operated by a thumb of a right hand (C). The passive movement key (4a) provides a passive movement, such as offering jumpings or lying downs for the character in case of receiving enemy attacks in the game, while the active movement key (4b) provides an active movement such as offering attacks for the character against its enemy in the game. Below the display portion (2) toward the right side of the game machine (1), a start key (5) is positioned to be operated by the right thumb (C), and on the upper and central portion of the machine (1), a speaker (6) is positioned. On the side of the machine (1), a switch (7), a volume controller (8) and a luminance controller (9) are furnished, and all of these equipments can be controlled by either of right or left thumb. On the back side of the machine (1), an insertion hole (11) is prepared to receive a cartridge (10) within which a memory cell storing a game program data is installed.

When the cartridge (10) is placed in the insertion hole (11), an operative function is offered to the cruciform key (3) to move the character in every direction as required. The cartridge (10) also specifies the character for the selection of the game or for the game situation requirements. On the other hand, another operative function is offered to the key set (4) comprising the passive movement key (4a) and the active movement key (4b), whereas the passive movement such as jumps or lying downs is provided for the former key (4a) while the active moment such as attacks is provided or the latter key (4b). The player operates these two function keys on his disposal to enjoy the game.

In the prior game machine (1), the LCD display portion (2) is produced in nearly square shape so that both vertical and horizontal scrolling games can be optionally adopted. In case where a square shape for the display portion (3) is adopted, some dead space on the display portion (2) is unavoidable. For instance, when the game is performed in a vertical display, both right and left sides of the portion (2) become dead, spaces, while if the game is performed in a horizontal display, both top and bottom sides become dead spaces. On these dead spaces, some characters or sceneries which are not required for the game development are displayed.

The LCD material used for the display portion (2) is very expensive and it constitutes large portion of the price of the hand-held LCD game machine. Thus, the excess material makes it difficult to lower the cost of the machine.

SUMMARY OF THE INVENTION

This invention relates to a hand-held LCD game machine having a ROM cartridge, wherein a player enjoys a game by watching a LCD display portion while connecting the game with manual operation of keys and switches by both thumbs. The machine is held by both hands.

The present invention has an object to develop a machine with a smaller amount of LCD material. A display portion in oblong shape is provided to obtain the cost reduction of the machine.

The invention has a further object to provide a smaller and more compact machine by adopting the smaller LCD material built into the machine.

In order to attain the above objects, the inventor has experienced many trials and errors, and finally he concluded that the dead space of the display portion of the prior art was a fatal defect. This invention provides a machine in lower cost and smaller size. The display portion is provided in an oblong shape after cutting off both sides of the different portions of the prior art square shape. Where the game is used in a vertical scrolling manner, the portion in oblong shape is displayed lengthwise, while when the game is used in a horizontal scrolling manner, the portion in oblong shape is displayed sideways.

This invention also provides plural operative means to perform the game by adopting input and output signals which are issued and caught by the machine or the inserted cartridge in accordance with the selected game. The game is displayed on the LCD display portion.

These plural operative means are devised to be controlled by both thumbs when the machine is held by both hands. The operation is adopted in sole thumb action or in combined thumb actions, so that various and complicated games can be developed.

At the same time, the plural operative means and the game program data are also memorized in the ROM cartridge. The game machine may have a variety of performances and choices.

BRIEF DESCRIPTION OF THE DRAWINGS

FIG. 22 is a block chart explaining a scan register.

FIG. 23(a) is a block chart explaining working function memory of a horizontal display mode.

FIG. 23(b) is a block chart explaining the working function memory of a vertical display mode.

DESCRIPTION OF PREFERRED EMBODIMENTS

Figure 1:
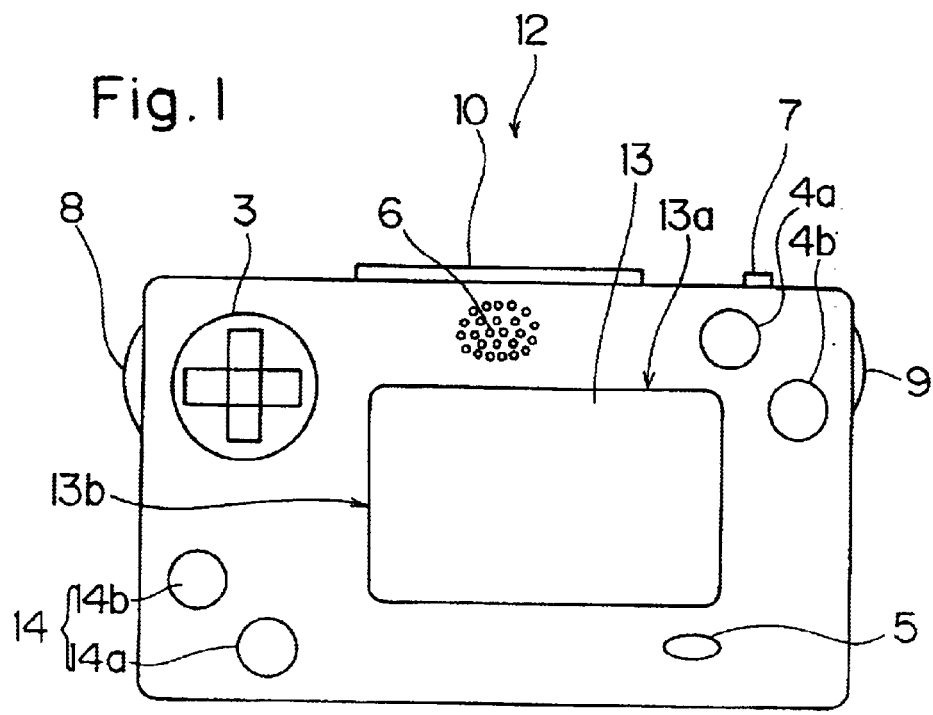
FIG. 1 is a plan view of a hand-held LCD game machine developed by this invention.

FIG. 1 is a first embodiment. A numeral 12 is a hand-held LCD game machine, and on the middle of the machine (12) a LCD display portion (13) is positioned. Where the machine (1) is held by both thumbs of a player's hands, a cruciform shift key (3) is established as a first operative means on the left side and in the vicinity of the long side (13a) of the display portion (13), and this key (3) is operated by a left thumb (B). Opposite to the key (3) position, namely on the right side and in the vicinity of the longer side (13a) a key set (4) comprising a passive movement key (4a)) and an active movement key (4b) is established as a second operative means to be operated by a right thumb. A little bit apart from a shorter side (13b) on the left side and toward the bottom of the machine (12), a similar key set (14) comprising a passive movement key (14a) and an active movement key (14b) is established as a third operative means.

Below the display portion (13) toward right bottom, a start key (5) is positioned so that the key (5) can be operated by the right thumb (C). Above the display portion (13) in the middle, a speaker (6) is located. On the sides of the machine (12), a power switch (7), a volume controller (8) and a luminance controller (9) which controls the luminance of the display portion (13) are prepared so that these switches can be operated by either right thumb (B) or left thumb (C). On the back side of the machine (12), an insertion hole (11) (not shown in the drawing) is formed to receive a cartridge (10) in which a game program data is already memorized. The cartridge (10) is inserted into the hole (11).

When a game is operated in a horizontal scrolling manner, a cartridge (10) with a memory cell for horizontal processing is inserted into the hole (11), as shown in FIG. 1. The machine (12) is held by both hands with the display portion (13) in sideways, and the shift key (3) is operated by the left thumb (B) while the key set (4) including the passive key (4a) and the active key (4b) is operated by the right thumb (B).

Figure 2:
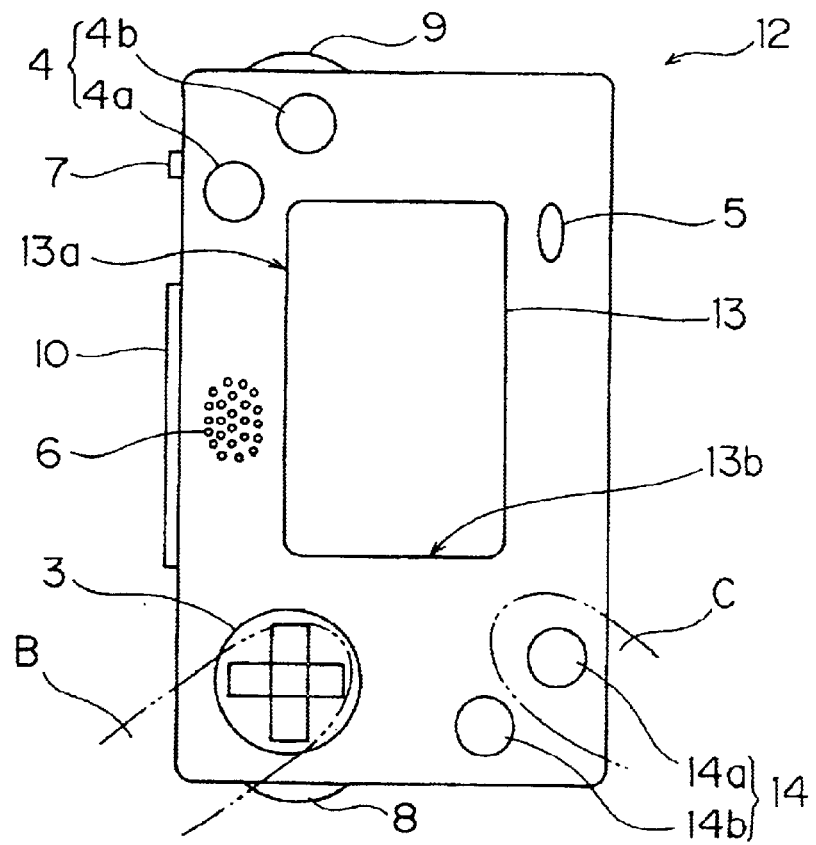
FIG. 2 is a plan view of the game machine which is turned round to the left at 90 degrees from the above FIG. 1.

When a game is operated in a vertical scrolling manner, the cartridge (10) with a memory cell for vertical processing is inserted into the hole (11), as shown in FIG. 2. The machine (12) is turned round to the left at 90 degrees and held by both hands with the display portion (13) in lengthwise, and the shift key (3) is operated by the left thumb (B) while the key set (14) including the passive key (14a) and the active key (14b) is operated by the right thumb (C).

As explained, the shift key (3) is to be always operated by the left thumb (B) while the set keys (4, 14) are to be always operated by the right thumb (C), and therefore a sense of incongruity is not occurred to a player during his operation when he plays the game in the horizontal or vertical manner.

The mutual position between the shift key (3) and the set key (4) or between the shift key (3) and the set key (14) is in the vicinity of the display portion (13) and is separated each other.

Figure 3:
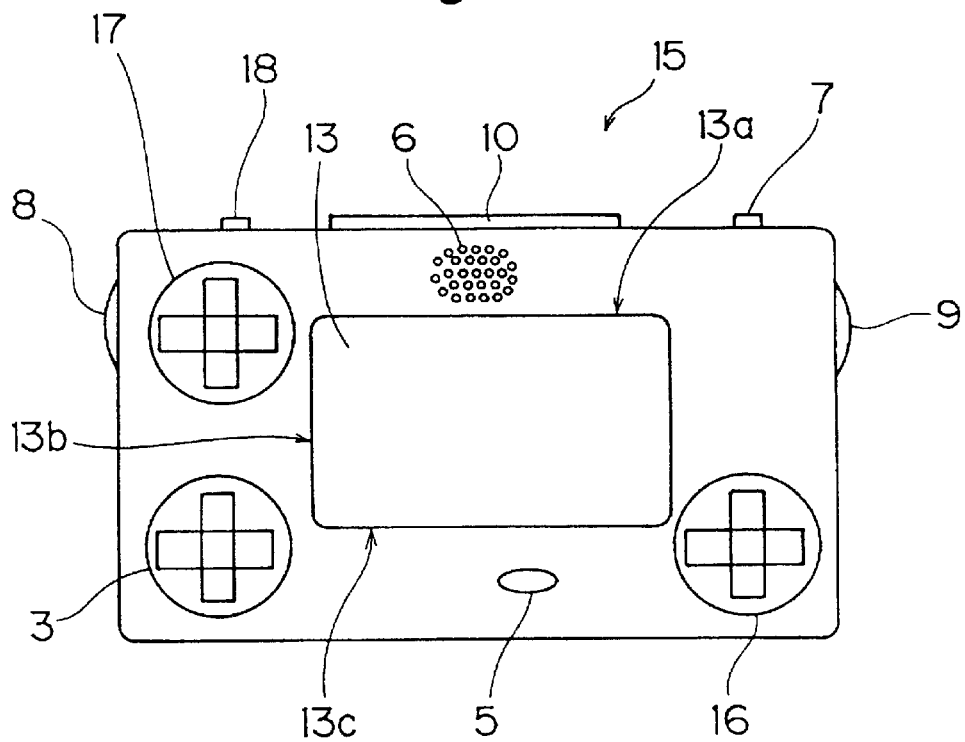
FIG. 3 is a plan view of the game machine indicating a second embodiment.

FIG. 3 shows a second embodiment. As seen in the first embodiment, this game machine (15) has a cruciform key (3), but in stead of the key sets (4 and 14), the same cruciform keys are adopted for the set keys under the numerals 16 and 17. The shift key (3) is positioned at the left and lower side, in the vicinity of a long side (13c) of the display portion (13) as the first operative means to be operated by the left thumb (B), while the similar cruciform key (16) as a movement key is positioned at the right and lower side, in the vicinity of the long side (13c) as the second operative means to be operated by the right thumb (C), and the similar key (17) as the third operative means is positioned at the upper and left side, in the vicinity of a short side (13b). On the upper and left side of the machine (15) a change-over switch (18) in sliding action is established, and it functions to change the shift key (3) into the movement key.

With regard to the movement key (16), if the right half is pushed, it functions as a passive movement same as the passive key (4a) of the first embodiment, while if the left half is pushed it functions as a active movement same as the active key (4b).

In this embodiment, the function of the shift key (3) is to be changed into the movement key (16). When a game is operated in the horizontal scrolling manner with the display portion as sideways, the shift key (3) is handled by the left thumb (B) and the movement key (16) is handled by the right thumb (C). When a game is operated in the vertical manner, the shift key (17) is handled by the left thumb (B) and the shift key (3) is now changed into the movement key to be handled by the right thumb (C).

On the space over and below of the movement key (16), some reserve functions can be also installed in accordance with the extra game procedures.

Figure 4:
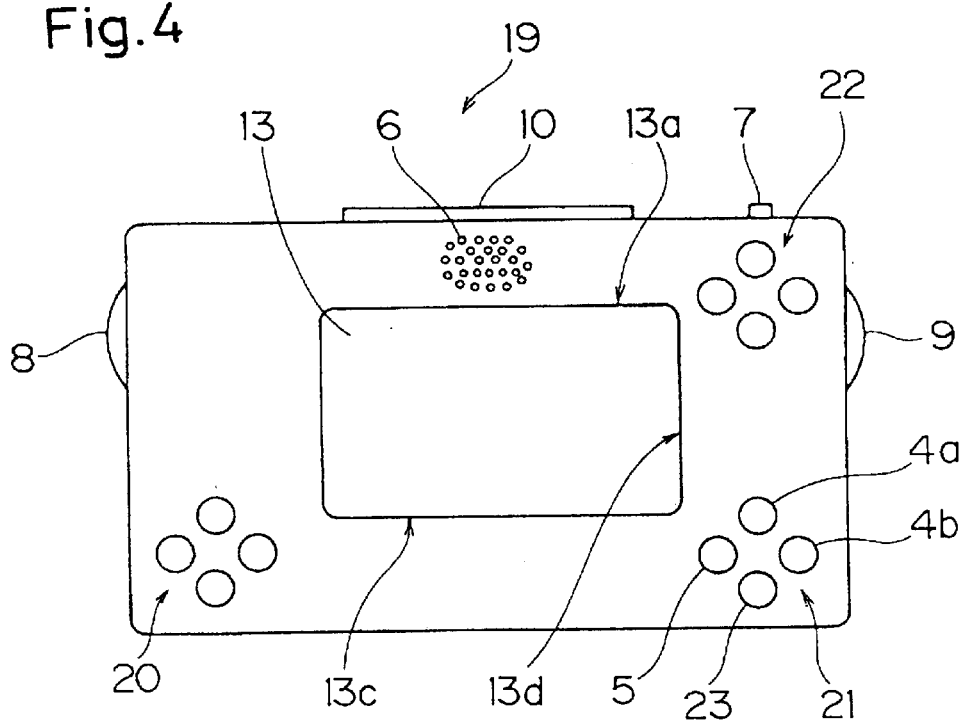
FIG. 4 is a plan view of the game machine showing a third embodiment.

FIG. 4 shows a third embodiment. A 4 button key set in lozenge-shape is adopted in stead of the cruciform key in the second embodiment. A shift key set (20) is positioned at the left and lower side, at long side (13c) of the display portion (13) as the second operative means to be handled by the left thumb (B), while the movement key set (21) is positioned at the right and lower side, at long side (13c) as the first operative means to be operated by the right thumb (C), and a shift key set (22) is positioned at he upper and right side, at short side (13d). With regard to the shift key set (20), the two high and low buttons control the movement of the character in the game in the high and low direction, while other two left and right buttons control the movement of the character in the left and right direction. With reference to the movement of the key set (21), the upper button functions as a passive movement, the right button functions the active movement, the left button functions the start key, and the bottom button is the reserve button.

Figure 5:
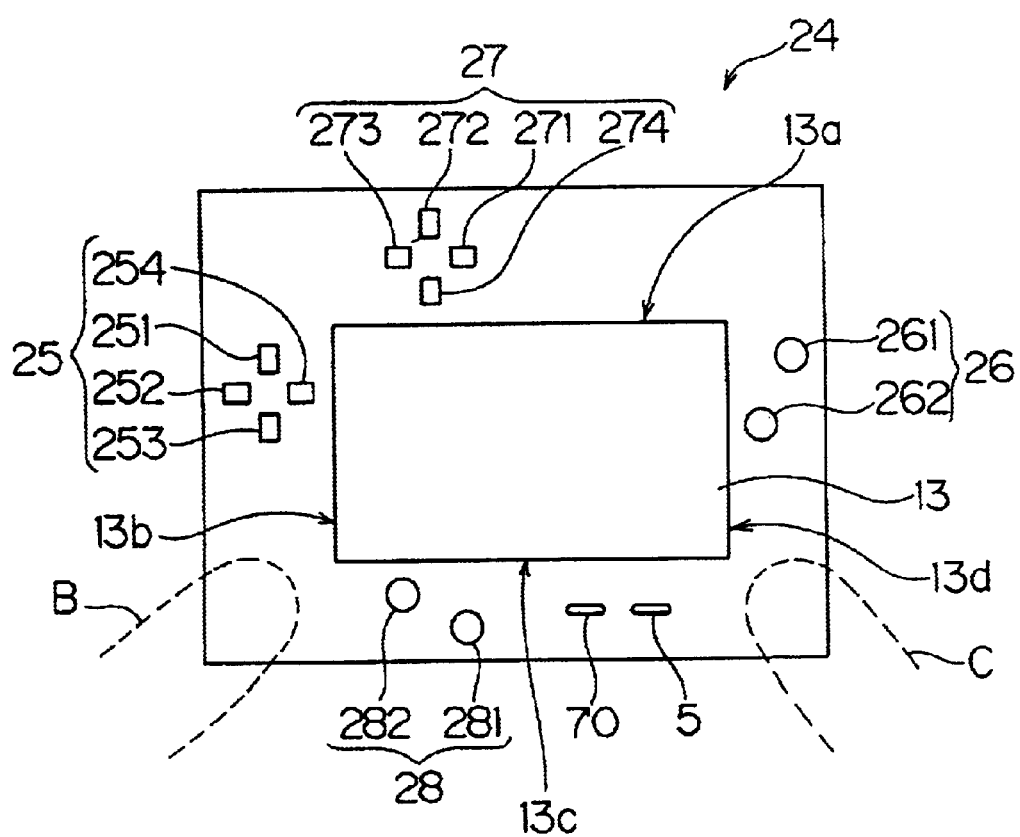
FIG. 5 is a plan view of the game machine showing a fourth embodiment.

FIG. 5 shows a fourth embodiment. A display portion (13) is shown sideways. A 4-piece cruciform shift key (25) is on the left side and positioned a little bit above the center portion of the machine (24) along short side (13b) as the first operative means to be handled by the left thumb (B). A 2-piece movement key (26) in uneven steps is positioned opposite to the shift key (25) along short side (13d) as the second operative means to be handled by the right thumb (C). When the display portion (13) is positioned lengthwise, a 4-piece cruciform shift key (27) having the same function as the key (25) is positioned along long side (13a) as the third operative means to be handled by the left thumb (B), while a 2-piece movement key (28) having the same function as the key (26) is positioned along the long side (13c) as the fourth operative means.

In the game machine (24), the cartridge (10) (not shown in the drawing) is equipped with program data for the horizontal scrolling game. As shown in FIG. 5, the machine (24) is held by both hands. The upper key switch (251) is allotted a role for the character to attack its enemy upwards, the left key switch (252) is allotted a role to move in the left direction, the bottom key switch (253) is allotted to as a role to move in the downward direction, and the right key switch (254) is allotted a role to move in the right direction. The upper key switch (261) is allotted a movement for the character to jump, and the bottom key switch (262) is allotted a movement to attack enemies with arms.

When the cartridge (10) is equipped with program data for the vertical scrolling game, the game machine (24) is held in lengthwise position. An upper key switch (271) is allotted the role for the character to attack its enemy upwards. A left key switch (272) is allotted the role to move the character in the left direction. The bottom key switch (273) is allotted to move the character in the downward direction. The right key switch (274) is allotted the role to move the character in the right direction. Upper key switch (281) is allotted the role for movement of the character to jump, and bottom key switch (282) is allotted the character movement for attacking enemies with arms.

The numeral 5 is a start key, and the numeral 70 is a select key for choosing the arms to be used.

In this embodiment, the shift key set (25) and the movement key set (26) are positioned on opposite sides of the display portion (13) when the display is held in the horizontal position, while the shift key (27) and the movement key (28) are in the same opposite sides of the display when held in the vertical position.

With reference to FIG. 6~FIG. 21, the fifth embodiment is now explained.

The game machine (29) in this embodiment is equipped with direction indicating keys. A first direction indicating key set (30) is established at the left and lower portion in the vicinity of a short side (13b) as the first operative means and the second direction key set (31) is established toward the upper portion as the third operative means. A 2-piece decision key (32) in uneven steps is established at the right and lower portion in the vicinity with a long side (13c) as the second operative means. A volume control button (8) and a start key (5) are separately formed below the long side (13c).

Figure 6:
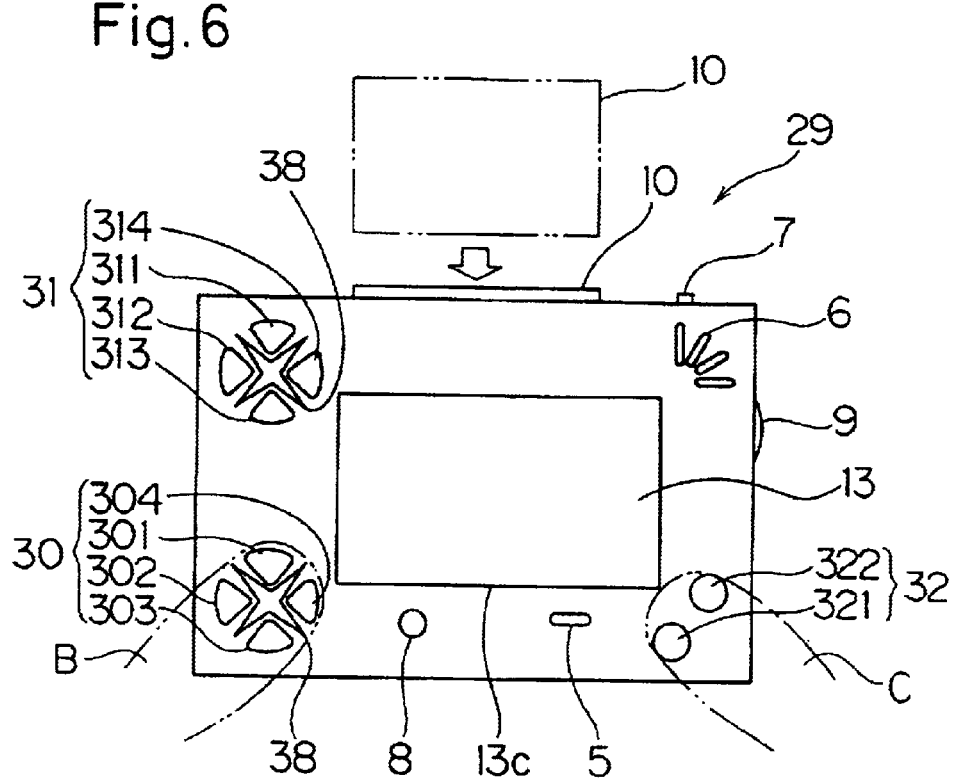
FIG. 6 is a plan view of the game machine, wherein a cartridge is to be inserted.

As shown in FIG. 6, the first direction indicating key set (30) comprises a first key switch (301), a second key switch (302), a third key switch (303) and a fourth key switch (304) while the second direction indicating key set (31) comprises a fifth key switch (311), a sixth key switch (312), a seventh key switch (313) and an eighth key switch (313). The decision key set (32) comprises a ninth key switch (321) and a tenth key switch (322).

Figure 9:
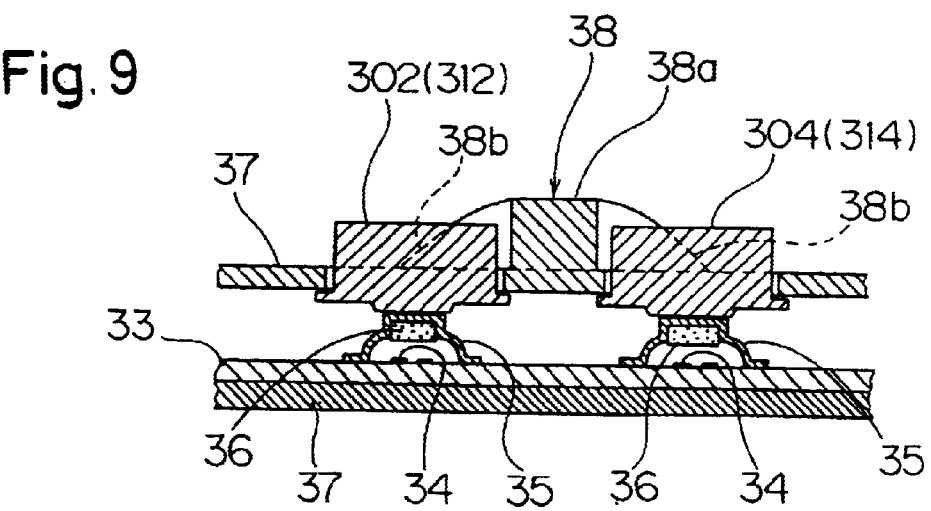
FIG. 9 is a sectional view along the line D—D of FIG. 8, wherein switch mechanism of the direction key is explained.

According to FIG. 9, each key switch has a key top to be pushed. A switch is pattern (34) formed on the substrate (33) of the game machine (29), a dome-like restorable material (35) with a flat top covers the switch pattern (34) and a conductive material (36) is formed on said flat top. Although it is not shown in the drawing, the above key switch is also adopted for the start key (5) and the volume control button (8).

The bottom of each key top contacts on the flat upper surface of the restorable material (35) and protrudes through a housing (37) of the machine (29). Thus, when the key top is pushed by the thumb, the restorable material (35) is transformed to contact on the switch pattern (34), which closes the circuit of the key switch. When the thumb is removed, the material (35) returns into its original form so that the conductive material (36) separates from the switch pattern (34) and opens the circuit.

Figure 8:
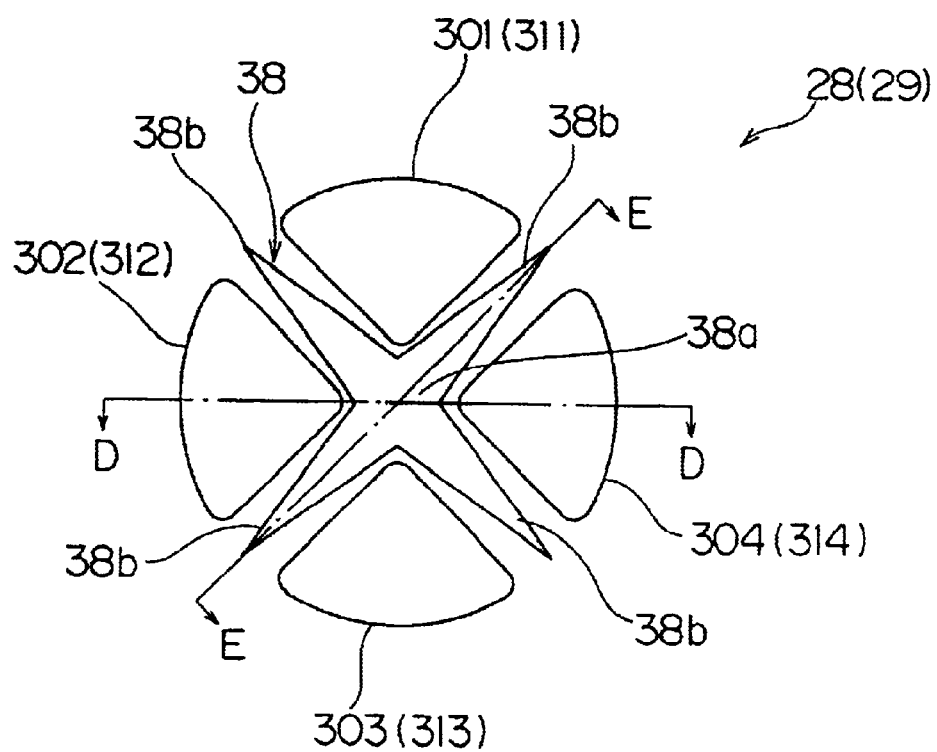
FIG. 8 is a plan view of a direction indicating key shown in FIG. 6 and FIG. 7.
Figure 10:
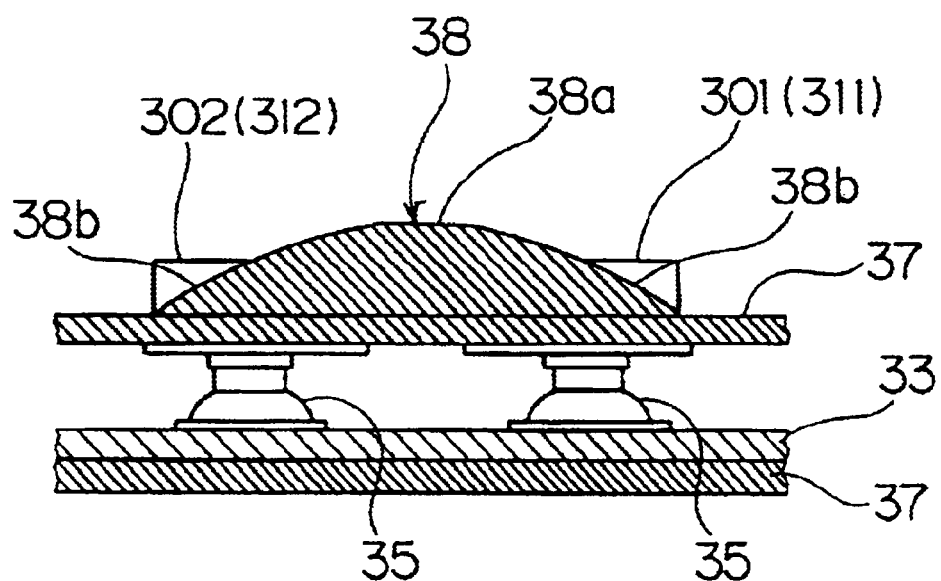
FIG. 10 is a sectional view along the line E—E of FIG. 8, wherein the switch mechanism of the direction key is further explained.

With reference to FIG. 8, FIG. 9 and FIG. 10, the four key tops (301, 302, 303, and 304) in the first indicating key set (30) and the other four key tops (311, 312, 313 and 314) in the second indicating key set (31) are separated by the partitioned walls (38) extending upward in X-letter like form from the surface of the housing (37). These walls (38) are swollen in the middle and incline toward the ends in all four directions, and the top end enters into the surface of the housing (37) around the outer circumference of the corresponding key tops.

In other words, all key tops (301, 302, 303, 304, 311, 312, 313 and 314) are separated by the partitioned walls (38) including the center portion (38a) and the end portion (38b), and thus they are all independent. Thus each key top can be pushed by the thumb independently so that adjoining key tops may not be pushed together.

Figure 11:
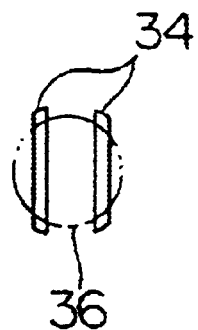
FIG. 11 is a plan view of a circuit of the switch mechanism as shown in FIG. 9 and FIG. 10.

FIG. 11 shows a circuit of the switch mechanisms shown in FIG. 9 and FIG. 10. The conductive material are shown in a sparse dotted line.

Figure 12:
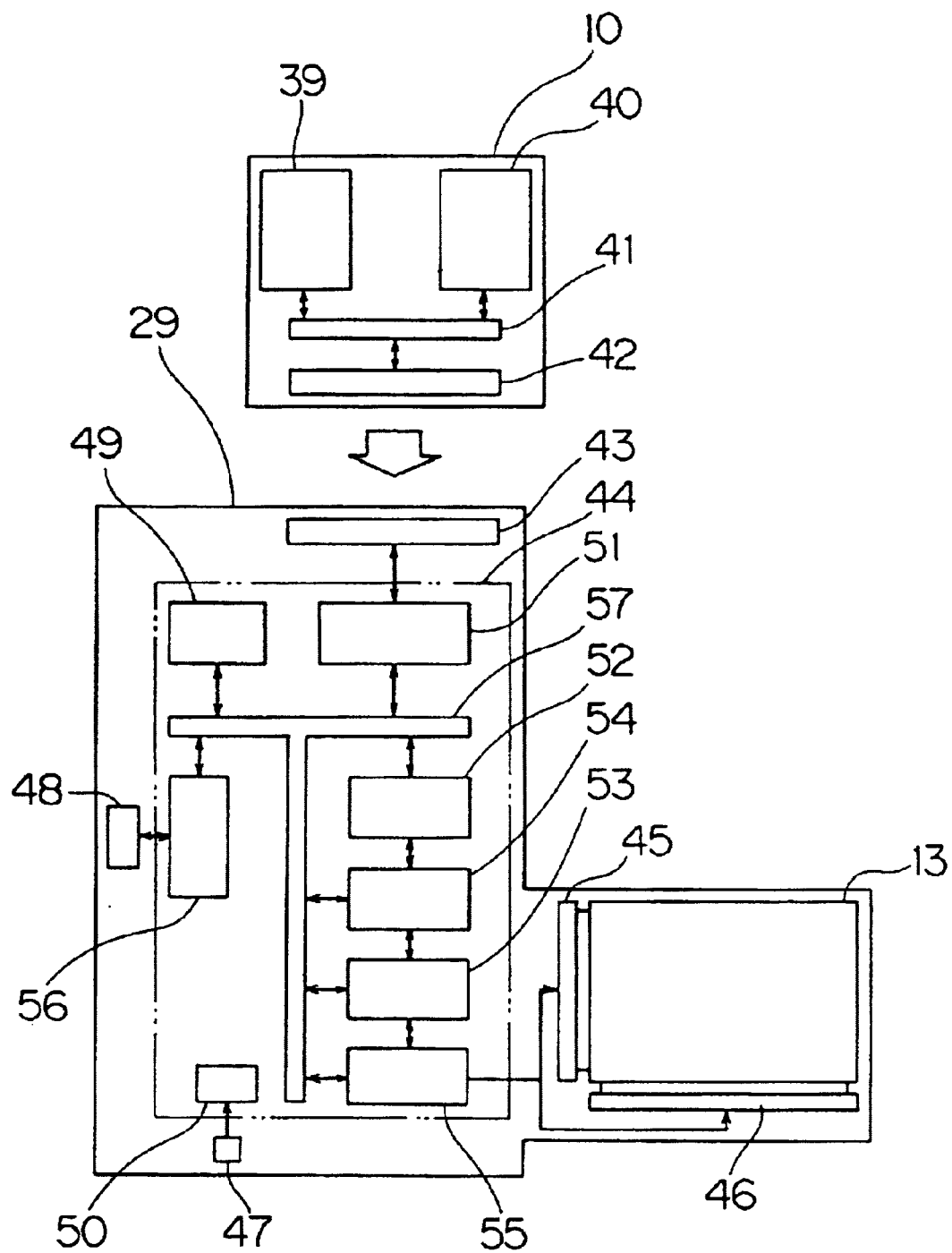
FIG. 12 is a block diagram showing the general circuit of the game machine and the cartridge as shown in FIG. 6 and FIG. 7.

With reference to FIG. 12, a circuit mechanism between the game machine (29) and the cartridge (10) is now explained.

On the substrate of the cartridge (10), a program ROM (39) in which a game program for the horizontal or/and vertical scrolling game is memorized, a saving RAM (40), a bus (41) and a cassette connector (42) are prepared. The saving RAM (40) stores temporarily the datum of the program ROM (39) and other data required for game processing such as item data or clear stage data. The connector (42) is connected with the program ROM (39) and the saving RAM (40) via the bus (41).

On the substrate of the game machine (29), a machine connector (43), a system LSI (44), a LCD display portion (13), a crystal oscillator (47) and an operation portion (48) are prepared. The connector (43) connects with the cassette connector (42), while the system LSI (44) reads the program data issued by the ROM (39) based on the input signal and controls the processing of the game properly and this LSI (44) also controls the image on the display portion (13). The display portion (13) is connected with the LSI (44) via a LCD common driver (45) and a LCD segment driver (46). The crystal oscillator (47) is arranged to cause a clock signal with simultaneous timing with the system LSI (44). The operation portion (48) comprises a start key (5), the first and second direction indicating keys (30 and 31) and the decision key (32). A speaker (5), a volume controller (8), a power supply switch (7), a luminance controller (9) and other peripheral devices including a power supply are omitted.

The system LSI (44) in the first place performs to initialize a register, RAM, a system area and also performs to indicate a logo mark. The LSI (44) is composed of, a CPU core (49) which reads the program data from the program ROM (39) of the cartridge (10) and outputs the relative results to each required device, an oscillating circuit (50) that issues a clock signal based on a pulse signal issued by the crystal oscillator (47), a bus interface (51) which is formed to input or output the data between the machine (29) and the cartridge (10). An inner RAM (52) which temporarily stores various data such as indication and sound data. The LSI (44) is connected with the inner RAM (52) to control the data areas thereof. The LSI (44) also includes a DMA controller (54) which transfers various data to a display controller (53) and a sound controller (not indicated in the drawing) without any control of the CPU core (49), a display controller (53) which is connected with the DMA controller (54) and changes co-ordinates, fonts, and screens transmitted from the inner RAM (52) into the display data, a LCD interface (55) which is connected with the display controller (53), positioned between the LCD common driver (45) and the LCD segment driver (46) and changes the display data into the data to be displayed at the display portion (13), a key interface (51) which is connected with the operation portion (48), and a inner bus (57) which connects the CPU core (49), the bus interface (51), the inner RAM (52),the DMA controller (54), the display controller (53), the LCD interface (55) and a key interface (56).

Figure 13:
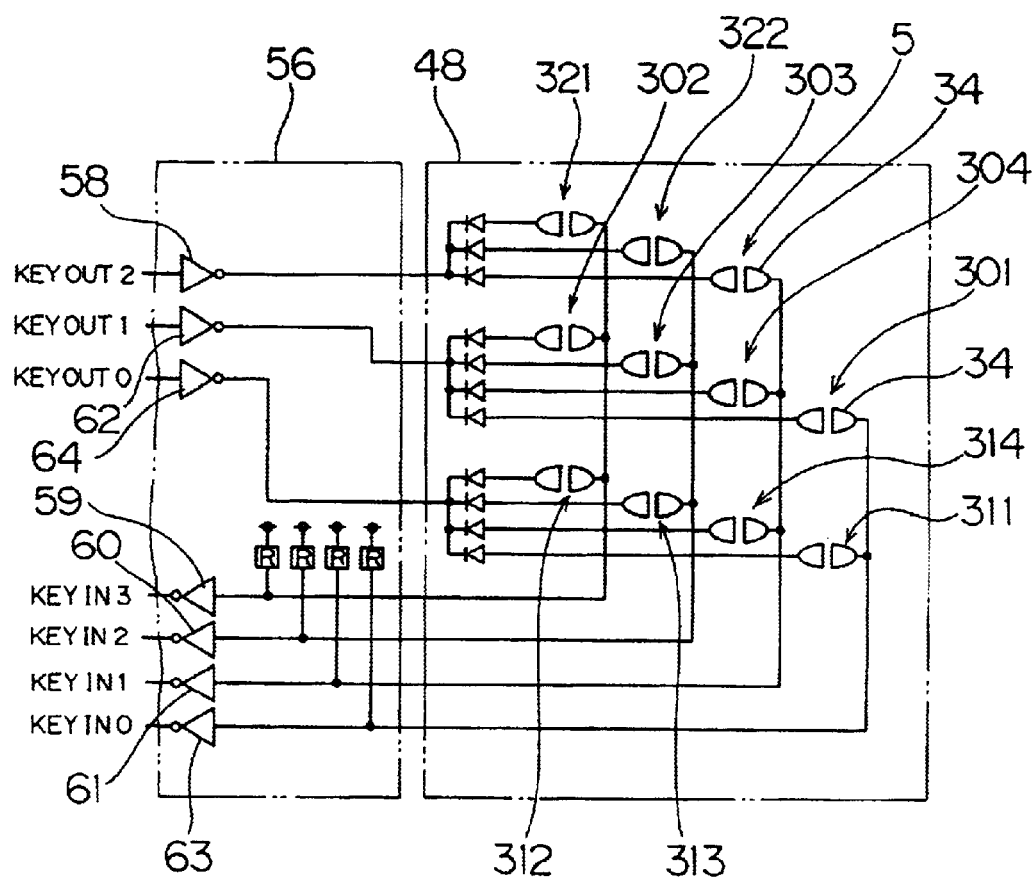
FIG. 13 is a logic circuit of an operative portion as shown in FIG. 12.

As shown in FIG. 13, in the operation portion (48), on the output side of a NOT circuit (58) wherein a signal wire (KEY OUT 2) of a key scan output signal is connected into the input side from the key interface (56) through the control of the CPU core (49), three reverse diodes are connected in parallel, and onto the input side of each diode, one end of each terminal of the ninth key switch (321), the tenth key switch (322) and the start key (5) is connected, while the other end of each terminal in the key interface (56) is connected with a power supply to cause a voltage (H) via a pull up resistance (R). The other end of the terminal of the ninth key switch (321) is connected with the input side of a NOT circuit (59) which is linked with a signal wire (KEY IN 3) OF a key scan input signal to be read by the CPU core (49), and similarly the other end of the terminal of the tenth key switch (322) is connected with the input side of a NOT circuit (60) linked with a signal wire (KEY IN 2) while the other end of the terminal of the start key (5) is connected with a NOT circuit (61) linked with a signal wire (KEY IN 1).

On the output side of the NOT circuit (62) wherein a signal wire (KEY OUT 1) of the key scan output signal is connected into the input side, four reverse diodes are connected in parallel, and onto the input side of each diode, one end of each terminal of the second key switch (302), the third key switch (303), the fourth key switch (304) and the first key switch (301) is connected, while the other end of each terminal in the key interface (56) is connected with a power supply to cause a voltage (H) via a pull up resistance (R). The other end of the terminal of the second key switch (302) is connected with the input side of the NOT circuit (59), and similarly the other end of the terminal of the third key switch (303) is connected with the input side of the NOT circuit (60), and the other end of the terminal of the fourth key switch (304) is connected with the input side of the NOT circuit (61), while the other end of the terminal of the first key switch (301) is connected with the input side of a NOT circuit (63) which is linked with a signal wire (KEY IN 0).

Moreover, on the output side of a NOT circuit (64) wherein a signal wire (KEY OUT 0) of the key scan output signal is connected into the input side, four reverse diodes are connected in parallel, and onto the input side of each diode, one end of each terminal of the sixth key switch (312), the seventh key switch (313), the eighth key switch (314) and the fifth key switch (311) is connected, while the other end of each terminal in the key interface (56) is connected with a power supply to cause a voltage (H) via a pull up resistance (R). The other end of the terminal of the sixth key switch (312) is connected with the input side of the NOT circuit (59), and similarly the other end of the terminal of the seventh key switch (313) is connected with the input side of the NOT circuit (60), and the other end of the terminal of the eighth key switch (314) is connected with the input side of the NOT circuit (61), while the other end of the terminal of the fifth key switch (311) is connected with the input side of a NOT circuit (63).

Through these procedures, the CPU core (49) reads the key scan input signals in the key interface (56) and judges whether the switch circuit is open or closed. In other words, when the switch circuit is open, all input signal wires (KEY IN 3, KEY IN 2, KEY IN 1, and KEY IN 0) show "L" conditions. In general, all output signal wires (KEY OUT 2, KEY OUT 1, and KEY OUT 0) are kept in "L" condition, and whether a specified switch circuit is closed or not pushed by the relative switch should be decided by the presence of the key scan input signal of "H" which is to be caused by the input signal wires (KEYIN 3, KEYIN 2, KEYIN 1 and KEYIN 0) via the output signal wires (KEY OUT 2, KEY OUT 1 and KEY OUT 0). Accordingly, in order to judge which circuit closes, "H" key scan output signal is tried on the wires (KEY OUT 2, KEY OUT 1 and KEY OUT 0) one by one with time difference, then which wires (KEY IN 3, KEY IN 2, KEY IN 1 and KEY IN O) issues the "H" signal can be decided and the pushed key switch can be recognized.

Now, the actual operation of the game machine is explained.

Figure 14:
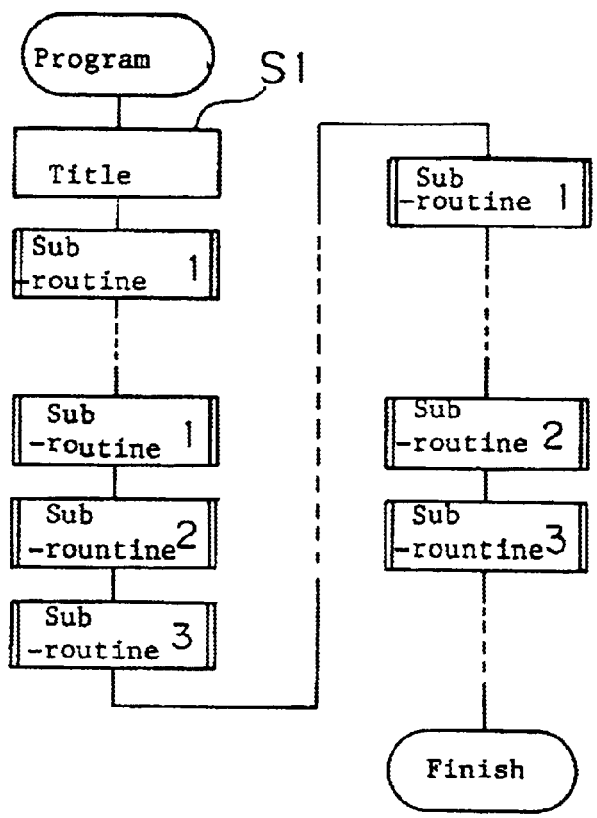
FIG. 14 is a flow chart explaining one example of a game program which is stored in the memory cell of the built-in cartridge.

A cartridge (10) wherein a horizontal scrolling game is memorized is inserted into the machine (29) for sideways display on the display portion (13), the cassette connector (42) is connected with the game connector (43), and power is supplied by the switch (7). Then, the CPU core (49) reads a game program data of the program ROM (39) of the cartridge via the bus interface (51). As shown in FIG. 14, in order to perform the order to display the title of the game, the displayed data are now memorized and stored temporarily into the inner RAM (52).

The data temporarily stored in the RAM (52) is transmitted to a display controller (53) through a DMA controller (54). The displayed data are converted into dots of display data in the display controller (53), and the converted data of dots display are by the control of the CPU core (49) transmitted to the display portion (13) through a LCD interface (55) via a LCD common driver (45) and a LCD segment driver (46), and finally the title of the game is shown in sideways on the display portion (13) as a Step S1.

Figure 15:
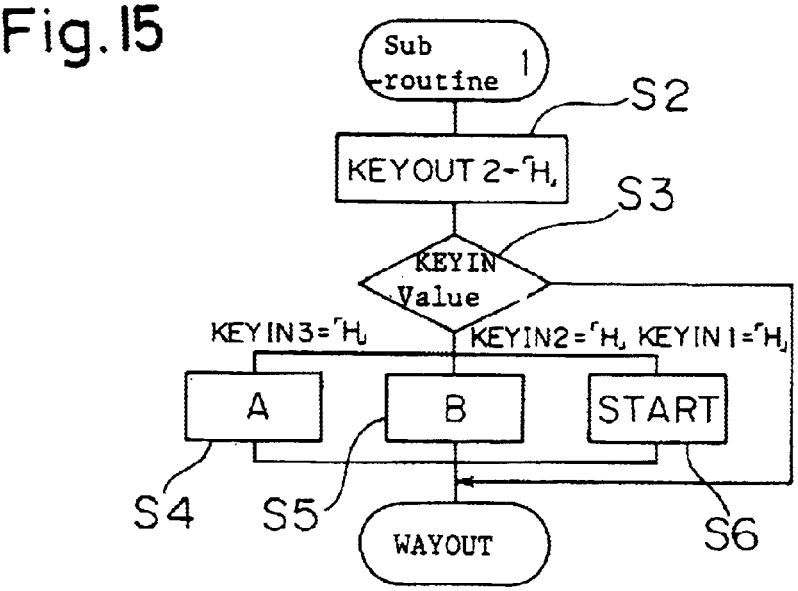
FIG. 15 is a flow chart explaining another example of the game program.

Next, if the program data memoried in the CPU core (49) are the orders for a subroutine 1, which allots a means for the operation function, in order to judge whether a start key (5) is put on or not, as shown in FIG. 15, the "H" key scan output signal is caused on the signal wire (KEY OUT 2) as a Step S2 from the key interface (56), and the CPU core (49) judges as a Step S3 whether the key scan input signal from the signal wires (KEY IN 3, KEY IN 2, KEY IN 1) is "L" or "H". When the "H" key scan input is caused from the signal line (KEY IN 1), the game is to start as the core (49) judges the start key (5) is pushed. The step where the start key is pushed on is a Step S6.

When the game is in progress, the subroutine 1 is performed whether a decision key (32) is put on or not. The "H" key scan output signal is caused in the signal wire (KEY OUT 2) as the Step S2 and the "H" key scan input signal is caused in the signal line (KEY IN 3), then an operation function "A" as a Step S4 is allotted to the ninth key (321) of the decision key (32) to provide functions of jumpings or attacks. When the "H" key scan input signal is caused in the signal wire (KEY IN 2), an operation function "B" as a Step S5 is allotted to the tenth key switch (322) of the decision key (32) to provide functions of circumstances settings or optional powers. Thus the game is developed.

Figure 16:
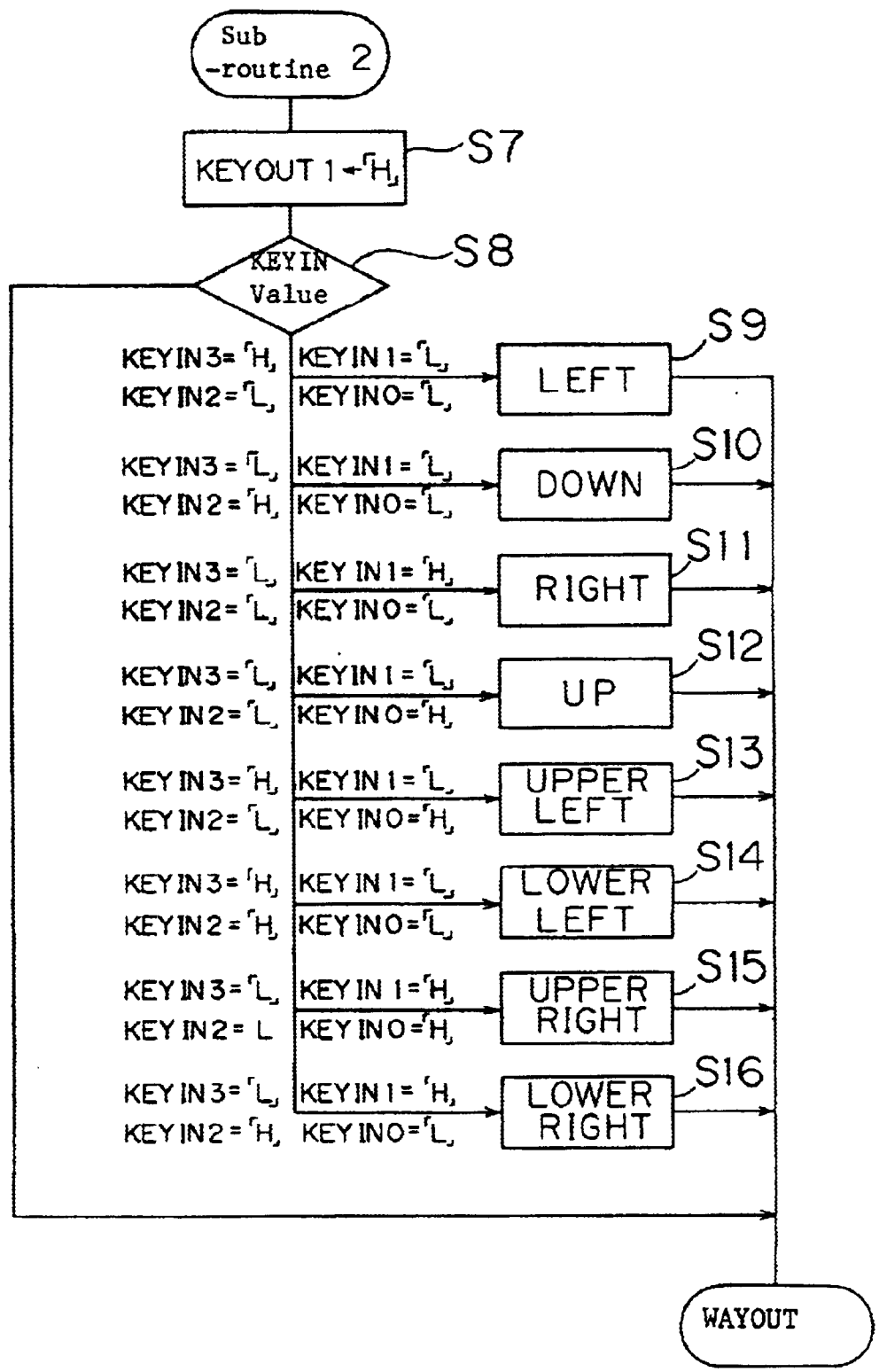
FIG. 16 is a flow chart explaining the other example of the game program.

As shown in FIG. 16, the subroutine 2 is performed whether a first direction indicating key (30) is put on or not. The "H" key scan output signal is caused in the signal wire (KEY OUT 1) as a Step S7 from the key interface (56), and the CPU core (49) judges as a Step S8 whether the key scan input signal from the signal wires (KEY IN 3, KEY IN 2, KEY IN 1 and KEY IN 0) is "L" or "H". When the "H" key scan input is caused from the signal line (KEY IN 3), an operation function "LEFT" as a Step S9 is allotted to the second key switch (302) of the first direction key (30) to provide the functions to move the character of the game or the cursor into the left direction. When the "H" key scan input signal is caused from the signal wire (KEY IN 2), an operation function "DOWN" as a Step S10 is allotted to the third key switch (303) of the first direction key (30) to provide the functions to move downwards, and when the "H" key scan input signal is caused from the signal wire (KEY IN 1), an operation function "RIGHT" as a Step S11 is allotted to the fourth key switch (304) of the first direction key (30), while the "H" signal is caused from the signal wire (KEY IN 0), an operation function "UP" as a Step S12 is allotted to the first key switch (301) respectively. When the "H" signal is caused, simultaneously from two signal wires (KEY IN 3 and KEY IN 0) and the first key switch (301) and the second key switch (302) are pushed on together, an operation function "UPPER LEFT" as a step S13 is allotted, while when the "H" signal is caused from two signal wires (KEY IN 1, and KEY IN 2) and the second key switch (302) and the third key switch (303) are pushed on together, an operation function "LOWER LEFT" as a Step S14 is allotted. Similarly, when the "H" signal is caused simultaneously from two signal wires (KEY IN 1 and KEY IN 0) and the first key switch (301) and the fourth key switch (304) are pushed on together, an operation function "UPPER RIGHT" as a step S15 is allotted, while when the "H" signal is caused from two signal wires (KEY IN 2 and KEY IN 1) and the third key switch (303) and the fourth key switch (304) are pushed on together, an operation function "LOWER RIGHT" as a Step S16 is allotted.

Figure 17:
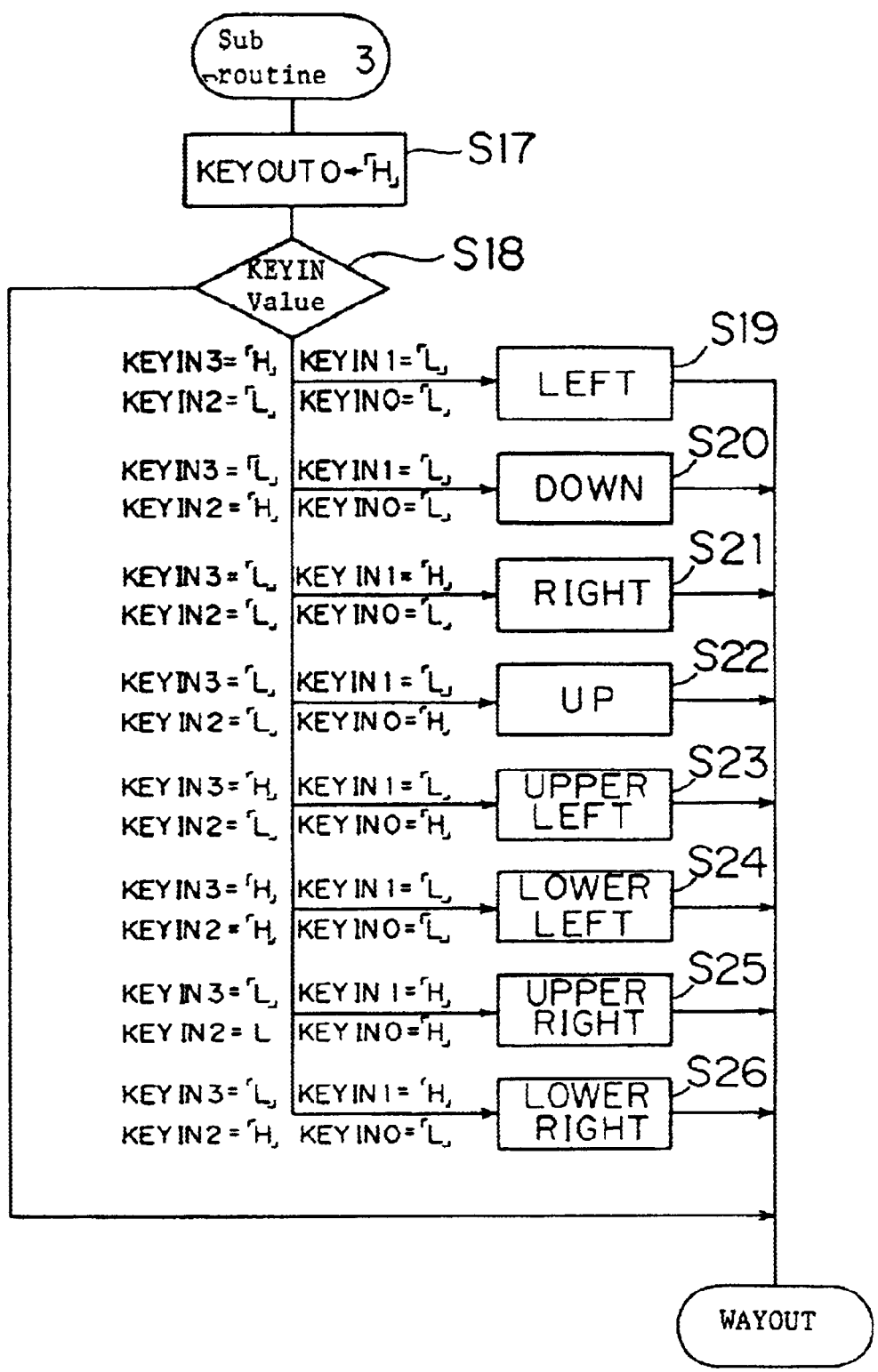
FIG. 17 is a flow chart explaining the further example of the game program.

In succession to the subroutine 2, as shown in FIG. 17, the subroutine 3 is performed whether a second direction indicating key (31) is put on or not. The "H" key scan output signal is caused in the signal wire (KEY OUT 0) as a Step S17 from the key interface (56), and the CPU core (49) judges as a Step S18 whether the key scan input signal from the signal wires (KEY IN 3, KEY IN 2, KEY IN 1 and KEY IN 0) is "L" or "H". When the "H" key scan input is caused from the signal line (KEY IN 3), an operation function "LEFT" as a Step S19 similar to the Step S9 in the subroutine 2 is allotted to the sixth key switch (312) of the second direction key (31) to provide the functions to move the character of the game or the cursor into the left direction. When the "H" key scan input signal is caused from the signal wire (KEY IN 2), an operation function "DOWN" as a Step S20 is allotted to the seventh key switch (313) of the second direction key (31) to provide the functions to move downwards, and when the "H" key scan input signal is caused from the signal wire (KEY IN 1), an operation function "RIGHT" as a Step S21 is allotted to the eighth key switch (314) of the second direction key (31), while the "H" signal is caused from the signal wire (KEY IN 0), an operation function "UP" as a Step S22 is allotted to the fifth key switch (311) respectively. When the "H" signal is caused simultaneously from two signal wires (KEY IN 3 and KEY IN 0) and the fifth key switch (311) and the sixth key switch (312) are pushed on together, an operation function "UPPER LEFT" as a step S23 is allotted, while when the "H" signal is caused from two signal wires (KEY IN 3 and KEY IN 2) and the sixth key switch (312) and the seventh key switch (313) are pushed on together, an operation function "LOWER LEFT" as a Step S24 is allotted. Similarly, when the "H" signal is caused simultaneously from two signal wires (KEY IN 1 and KEY IN 0) and the fifth key switch (311) and the eighth key switch (314) are pushed on together, an operation function "UPPER RIGHT" as a step S25 is allotted, while when the "H" signal is caused from two signal wires (KEY IN 2 and KEY IN 1) and the seventh key switch (313) and the eighth key switch (314) are pushed on together, an operation function "LOWER RIGHT" as a Step S26 is allotted.

In the procedures from the subroutine 1 to the subroutine 3, in case if the signal wires (KEY IN 3, KEY IN 2, KEY IN 1 and KEY IN 0) indicate "L", the CPU core (49) judges all key switches are not pushed on.

As explained so far, the first and the second direction indicating keys (30 and 31) have functions to instruct the movement directions or movement changes, while the decision key (32) has functions to instruct some special actions or commands. It is also available to program the second direction indicating key (31) as the annulment key, or else to program as the other special action key.

Figure 18:
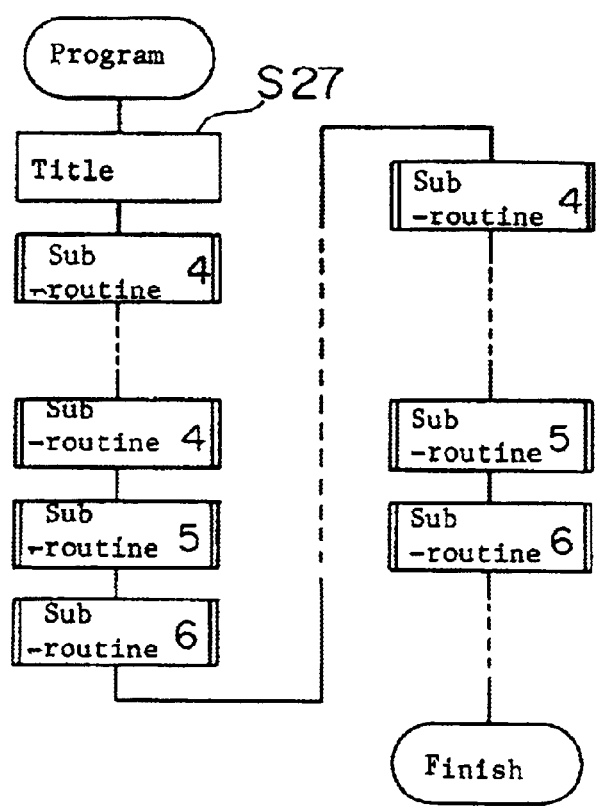
FIG. 18 is a flow chart explaining the further example of the game program.
Figure 19:
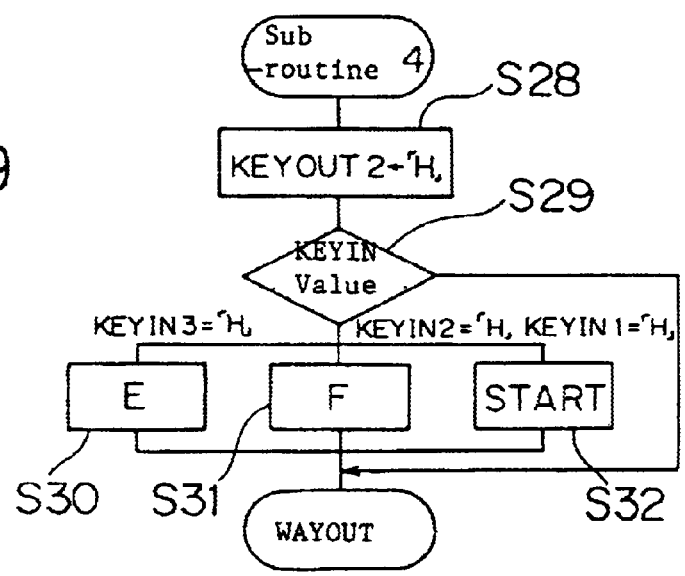
FIG. 19 is a flow chart explaining the further example of the game program.

Now, the cartridge where a vertical scrolling game is memorized is now inserted into a game machine (29). As shown in FIG. 18, in the vertical game program, the title of the game is shown in lengthwise on the display portion (13) as a Step S27, and during the game is in progress, the subroutine 4 is performed. As shown in FIG. 19, the "H" key scan output signal is caused in the signal wire (KEY OUT 2) as the Step S28, and the CPU core (49) judges as a Step 29 the key scan input signal issued from the signal wires (KEY IN 3, KEY IN 2 and KEY IN 1) comes into the key interface (56). When the "H" key scan input signal is caused in the signal line (KEY IN 3), then an operation function "E" as a Step S30 is allotted to the ninth key (321) of the decision key (32) to provide functions of jumpings or attacks same as the Step S4 of the function "A". When the "H" key scan input signal is caused in the signal wire (KEY IN 2), an operation function "F" as a Step S31 is allotted to the tenth key switch (322) of the decision key (32) to provide functions of additional movements. When the "H" key scan input signal is caused from the signal wire (KEY IN 1), the CPU core (49) judges the start key (5) is pushed on, and thus the game is developed.

Figure 20:
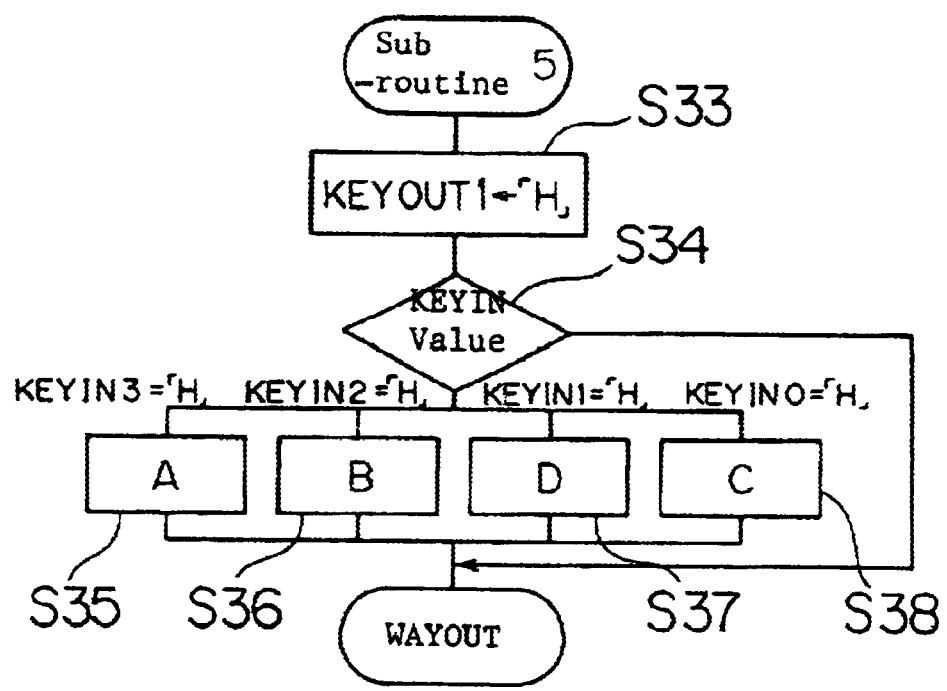
FIG. 20 is a flow chart explaining the further example of the game program.

During the game procedure, as shown in FIG. 20, the subroutine 5 is performed. The "H" key scan output signal as a Step S33 is caused from the signal wire (KEY OUT 1), and the judgement as a Step S34 is made, and then when the "H" key scan input signal is caused from the signal wire (KEY IN 3), as a Step S35 the function "A" is allotted, whose function is the same as the second key switch (302) of the first direction indicating key (30) to move "LEFT" and as the ninth key switch (321) of the decision key (32) to offer jumps and attacks. When the "H" key scan input signal is caused from the signal wire (KEYIN 2), as a Step S36 the function "B" is allotted, whose function is the same as the third key switch (303) of the first direction indicating key (30) to move "DOWN" and as the tenth key switch (322) of the decision key (32) to offer game circumstances and options. When the "H" key scan input signal is caused from the signal wire (KEY IN 1), as a Step S37 the function "D" is allotted, whose function is the same as the fourth key switch (304) of the first direction indicating key (30) to move "RIGHT", while when the "H" key scan input signal is caused from the signal wire (KEY IN 0), as a Step S38 the function "C" is allotted, whose function is the same as the first key switch (304) of the first direction indicating key (30) to move "UP".

Figure 21:
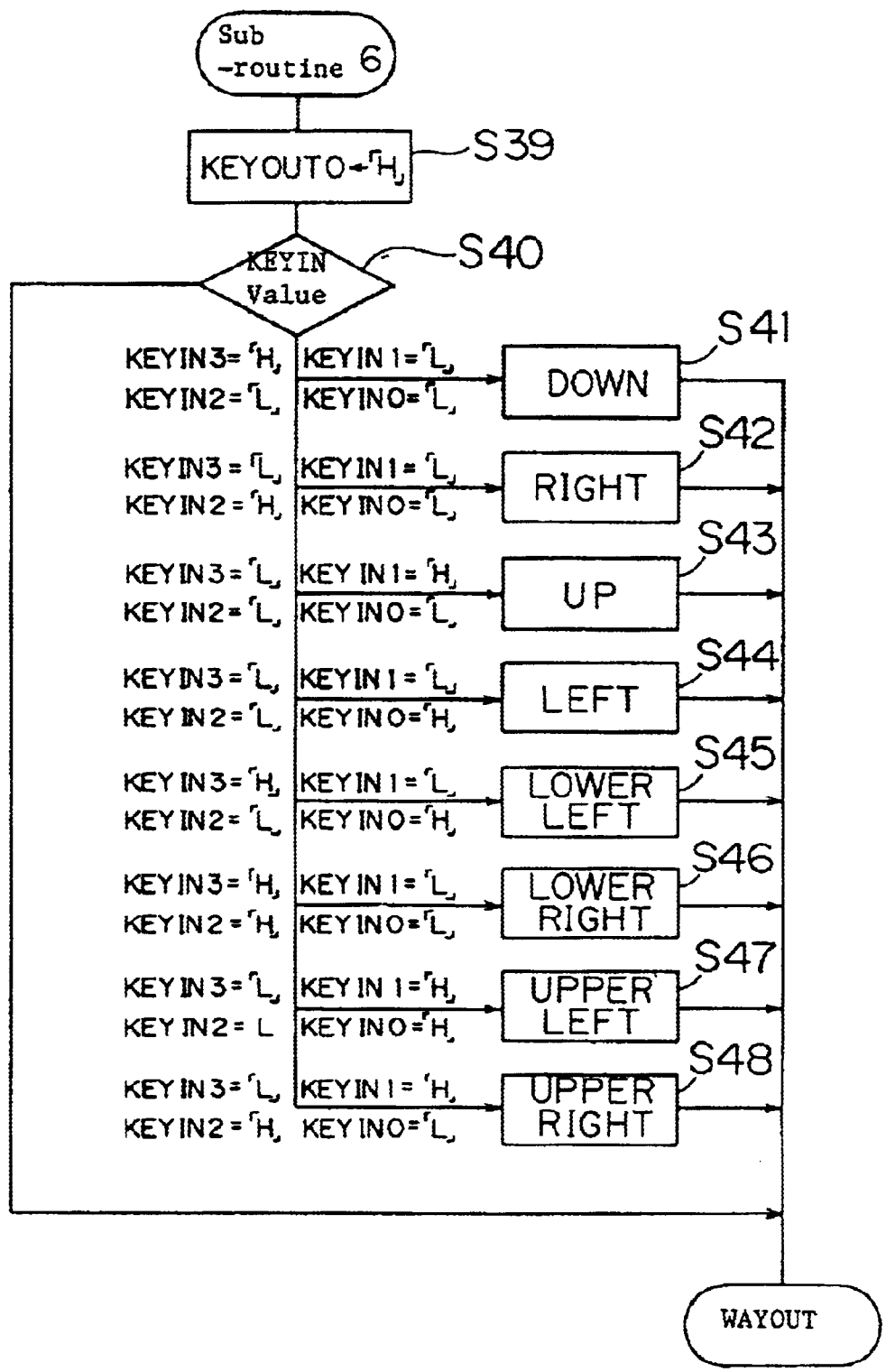
FIG. 21 is a flow chart explaining the further example of the game program.

During the game procedure, as shown in FIG. 21, the subroutine 6 is performed. The "H" key scan output signal as a Step S39 is caused from the signal wire (KEYOUT 0), and the judgement as a Step S40 is made, and then when the "H" key scan input signal is caused from the signal wire (KEY IN 3), as a Step S41 the function "DOWN" is allotted to the sixth key switch (312) of the second direction indicating key (31) to start active movements like attacks downwards. When "H" key scan input signal is caused from the signal wire (KEY IN 2), as a Step S42 the function "RIGHT" is allotted to the seventh key switch (313) of the second direction indicating key (31) to move the character and cursor into right direction. When the "H" key scan input signal is caused from the signal wire (KEY IN 1), as a Step S43 the function "UP" is allotted to the eighth key switch (314) of the second direction indicating key (31) to offer active movements upwards, while when the "H" key scan input signal is caused from the signal wire (KEY IN 0), as a Step S44 the function "LEFT" is allotted to the fifth key switch (314) of the second direction indicating key (31) to move "UP".

When the "H" signal is caused simultaneously from two signal wires (KEY IN 3 and KEY IN 0) and the fifth key switch (311) and the sixth key switch (312) are pushed on together, an operation function "LOWER LEFT" as a step S45 is allotted same as explained in the subroutine 2, while when the "H" signal is caused from two signal wires (KEY IN 1 and KEY IN 0) and the sixth key switch (312) and the seventh key switch (313) are pushed on together, an operation function "LOWER RIGHT" as a Step S46 is allotted. Similarly, when the "H" signal is caused simultaneously from two signal wires (KEY IN 1 and KEY IN 0) and the fifth key switch (311) and the eighth key switch (314) are pushed on together, an operation function "UPPER LEFT" as a step S47 is allotted, while when the "H" signal is caused from two signal wires (KEY IN 2 and KEY IN 1) and the seventh key switch (313) and the eighth key switch (314) are pushed on together, an operation function "UPPER RIGHT" as a Step S48 is allotted In the game development in the vertical scrolling, the ninth and tenth keys (321 and 322) of the decision key (32) may be programed as the annulment key, while the first and forth key switch (301 and 304) are also treated as the annulment key.

Figure 7:
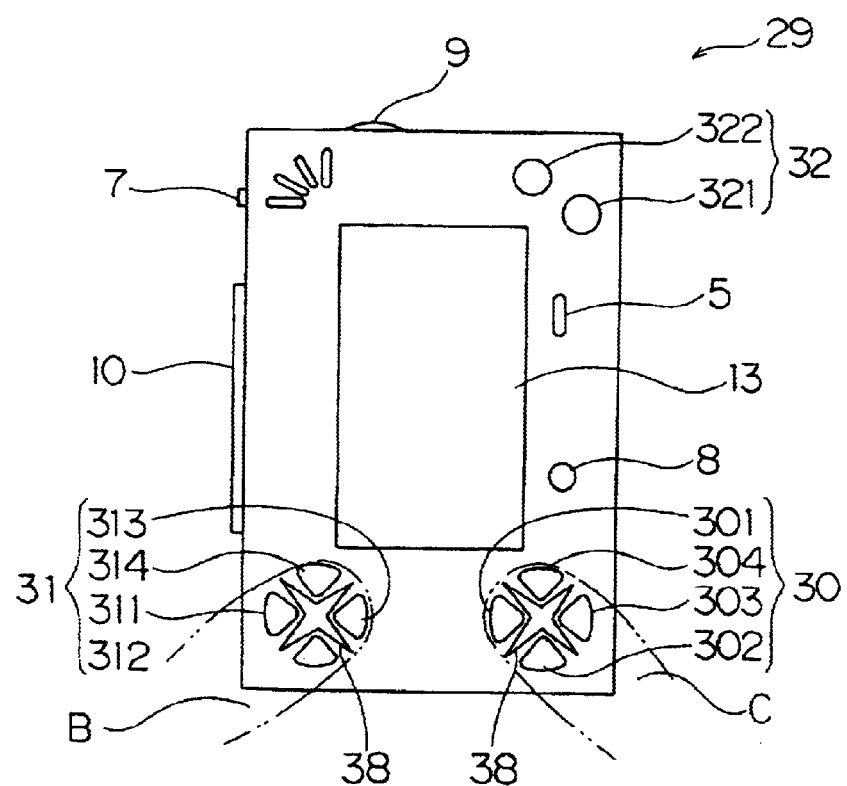
FIG. 7 is a plan view of the game machine which is turned round to the left at 90 degrees from the above FIG. 6.

In case if the cartridge (10) where a horizontal/vertical scrolling games are memorized is inserted into the game machine (29), in order to operate the game properly, the subroutines 1, 2 and 3 are adopted for horizontal display as shown in FIG. 15, FIG. 16 and FIG. 17, while the subroutines 4, 5 and 6 are adopted for vertical display as shown in FIGS. 19, 21 and 22. For example, as shown in FIG. 6, in the mode wherein the machine (29) is held by both hands and the display portion (13) is shown in sideways, the first key switch (301) of the first direction indicating key (30) is allotted with the "UP" function to offer active movements toward the upside, while, as shown in FIG. 7, where the machine (29) is held lengthwise, namely in the vertical display, the "UP" function allotted to the first key switch (301) is now changed to be allotted to the eighth key (314) of the second direction indicating key set (31).

The active functions allotted to the first and second direction indicating key sets (30 and 31) may be changed to decide the shifting direction or the attacking directions through the selection of the decision key set (32).

In the present embodiment, in the display portion (13) where the horizontal scrolling game is performed, the functions "UP", "UPPER LEFT", "LEFT", "LOWER LEFT", "DOWN", "LOWER RIGHT", "RIGHT", and "UPPER RIGHT" as well as "A" and "B" are allotted to the first direction indicating key set (30) and the decision key set (32) by the means of the subroutines 1, 2 and 3. On the other hand, in the display portion (13) where the vertical scrolling game is performed, the functions "UP", "UPPER LEFT", "LEFT", "LOWER LEFT", "DOWN", "LOWER RIGHT", "RIGHT", and "UPPER RIGHT"as well as "A" and "B" are allotted to the second direction indicating key set (31) and the first direction indicating key set (30) by the means of the subroutines 4, 5 and 6. Where the program contains both horizontal and vertical scrolling games, it is adapted to adopt the means of the subroutines 1, 2 and 3 for the horizontal scrolling while the means of the subroutines 4, 5 and 6 are adopted.

The constitution of the first and second direction indicating keys sets (30 and 31) provides a X-letter like division wall (38) on the middle separating four key switch tops and this constitution makes it possible to operate the key tops independently and also to operate plural tops together, and at the same time those tops can be used as a direction indicating key or a decision key for the first and second direction indicating key sets (30 and 31). This constitution provides both functions to be operated independently and to be operated as a single switch, which offers a good operability for the machine (29).

With regard to the height of the key top protruding from the surface of the housing (37), it should be adapted not to close the switch circuit when the thumb is placed over the central portion (38a) of the division wall (38), and this height is acceptable higher or lower than the central portion (38).

As the conductive material, conductive rubber may be used.

With reference to FIG. 6~FIG. 13, FIG. 22 and FIG. 23, the sixth embodiment is now explained. FIG. 22 is a block chart showing a scan register, while FIG. 23 is a block chart showing an operation function memory. The FIG. 23(a) shows an operation function memory for the horizontal display, and the FIG. 23(b) shows an operation function memory for the vertical display. The scan register (65) as a means of allotting functions is formed in the key interface (56). A flag of the bit "1" as function signal stands when each key switch circuit of each independent register (5, 301~304, 311~314, 321 and 322) is closed, and the flag of the bit "1" also stands when each key switch circuit of each adjoining register (301/302, 302/303, 303/304, 304/301, 311/312, 312/313, 313/314 and 314/311) is closed. Operation function memories comprise a function memory (66) for the horizontal display and a function memory (67) for the vertical display, and they are formed in the saving RAM (40) in correspondence with the scan register (65).

When the cartridge (10) in which the horizontal scrolling game is programed is built in the machine (29), the title of the game is shown.

During the game development, the "H" key scan output signal is inserted in the signal wire (KEY OUT 1) from the key interface (56) through the control of the CPU core (49) in order to judge whether the first direction indicating key set (30) is pushed on or not. When the "H" key scan input signal is received from the signal wire (KEY IN 3), the flag of the bit "1" stands at the register (302) of the scan register (65). The key interface (56) is always scanning the scan register (65), and once the "1" flag stands, through the control of the CPU core (49), the second key switch (302) of the first direction indicating key set (30) is allotted to the operation function "LEFT" to shift the character or the cursor into the left direction, and thus the game is performed.

When the cartridge (10) in which the vertical scrolling game is programed is inserted into the machine (29) the title of the game is shown. During the game procedures, the "H" key scan output signal is present in the signal wire (KEY OUT 0), and the "H" key scan input signal is received from the signal wire (KEY IN 2 and KEY IN 1), the flag of the bit "1" stands at the register (313/314) of the scan register (65). Through the control of the CPU core (49), when the seventh key switch (313) and the eighth key switch (314) of the second direction indicating key (31) is pushed simultaneously, the operation function "UPPER RIGHT" is allotted thereof to make active movements toward the upper right direction, and thus the game is developed.

In case where the cartridge in which a horizontal/vertical mixed games is programed is built into the game machine, the title of the game is displayed accordingly in sideways or lengthwise. When the game is proceeded in the horizontal manner, the operation function memory (66) for the horizontal display is adopted, while, when the game is proceeded in the vertical manner, the function memory (67) is adopted.

With regard to the operation function memories (66 and 67), they can be established in the inner RAM (52), and when the game program is performed, all function data are read from the program ROM (39) and can be stored in the memories (66 and 67) in correspondence with the scan register (65).

As explained, in the horizontal scrolling game, the function signals for operation are obtained by a set of the operative means constituted from the first direction indicating key set (30) and the decision key set (32), while, in the vertical scrolling game, the same function signals are obtained by the corresponding operative means constituted from the second direction indicating key set (31) and the first direction indicating key set (30).

In this embodiment, once the game program is started, function data for operation are memoried in the saving RAM of the cartridge or in the inner RAM of the machine in the proper guidance of the horizontal or vertical scrolling game.

The seventh embodiment is now explained with reference to FIG. 6~FIG. 11, FIG. 13~FIG. 21 and FIG. 24~FIG. 26.

Figure 24:
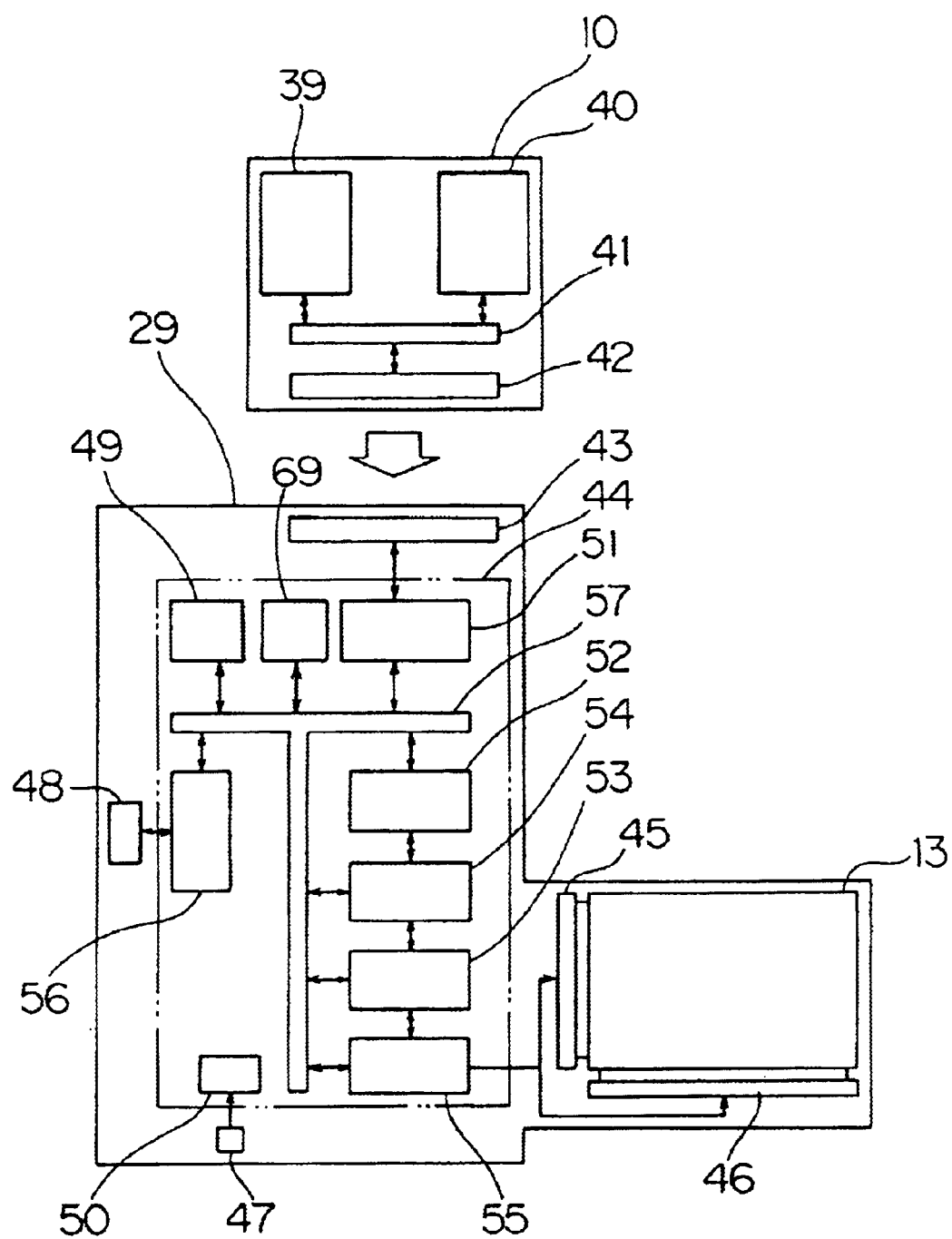
FIG. 24 is a block diagram explaining a general circuit between the hand-held LCD game machine and the cartridge.
Figure 25:
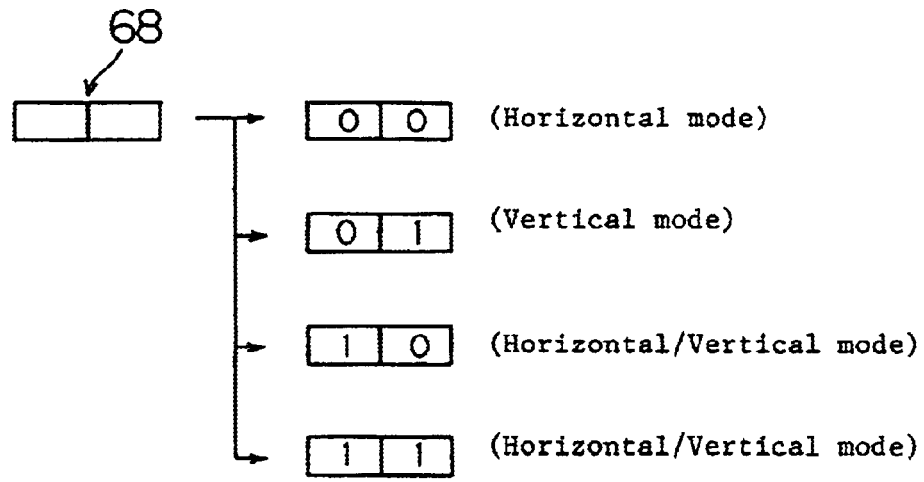
FIG. 25 is a block chart explaining a decision memory for vertical or horizontal mode in the cartridge.
Figure 26:
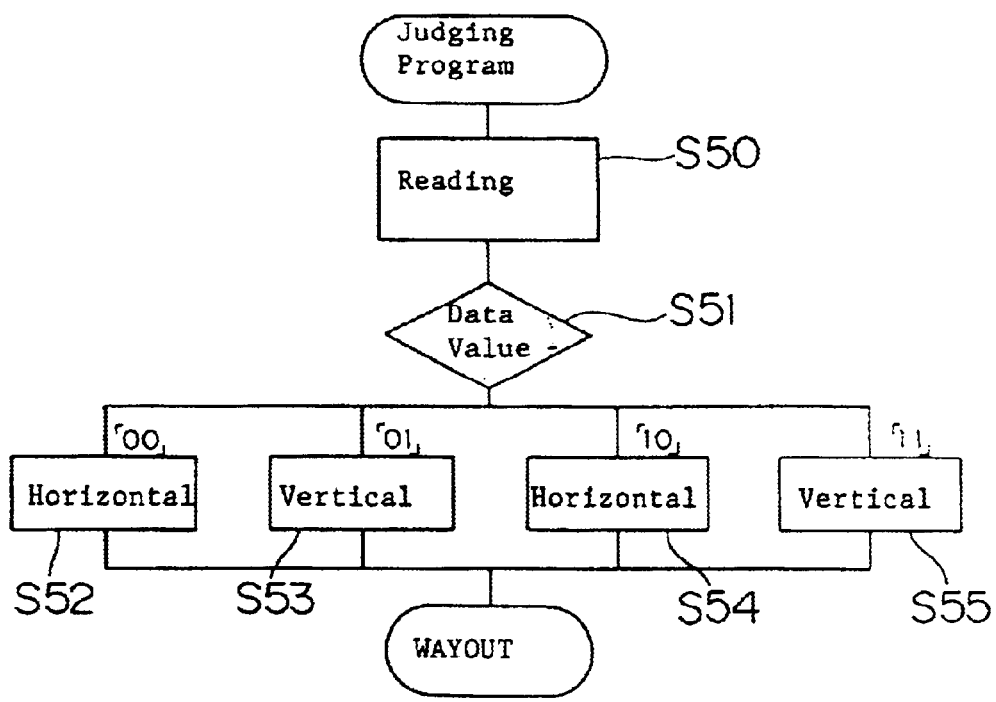
FIG. 26 is a flow chart explaining a decision program for vertical or horizontal mode.
Figure 27:
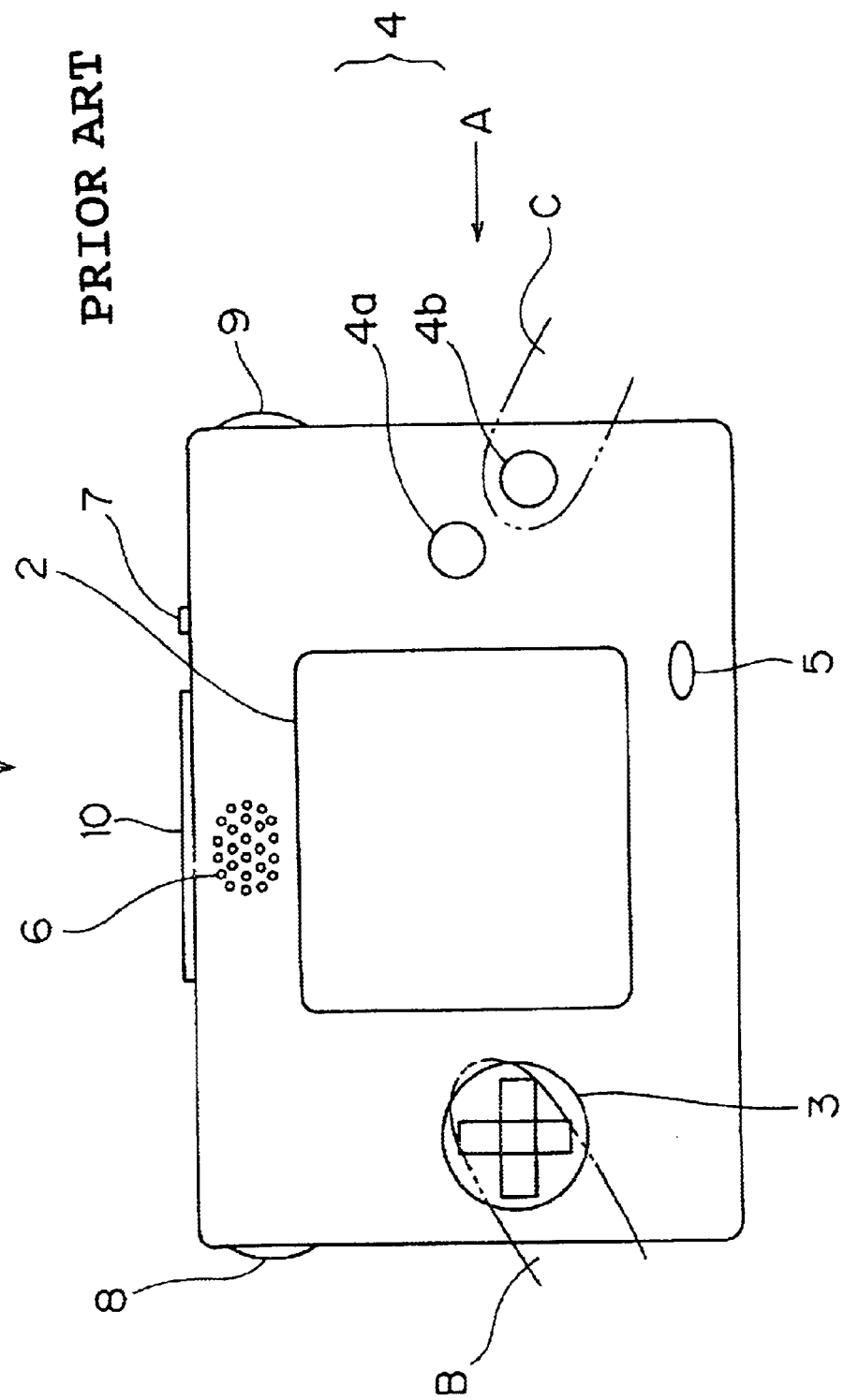
FIG. 27 is a plan view of the game machine developed by prior art.
Figure 28:
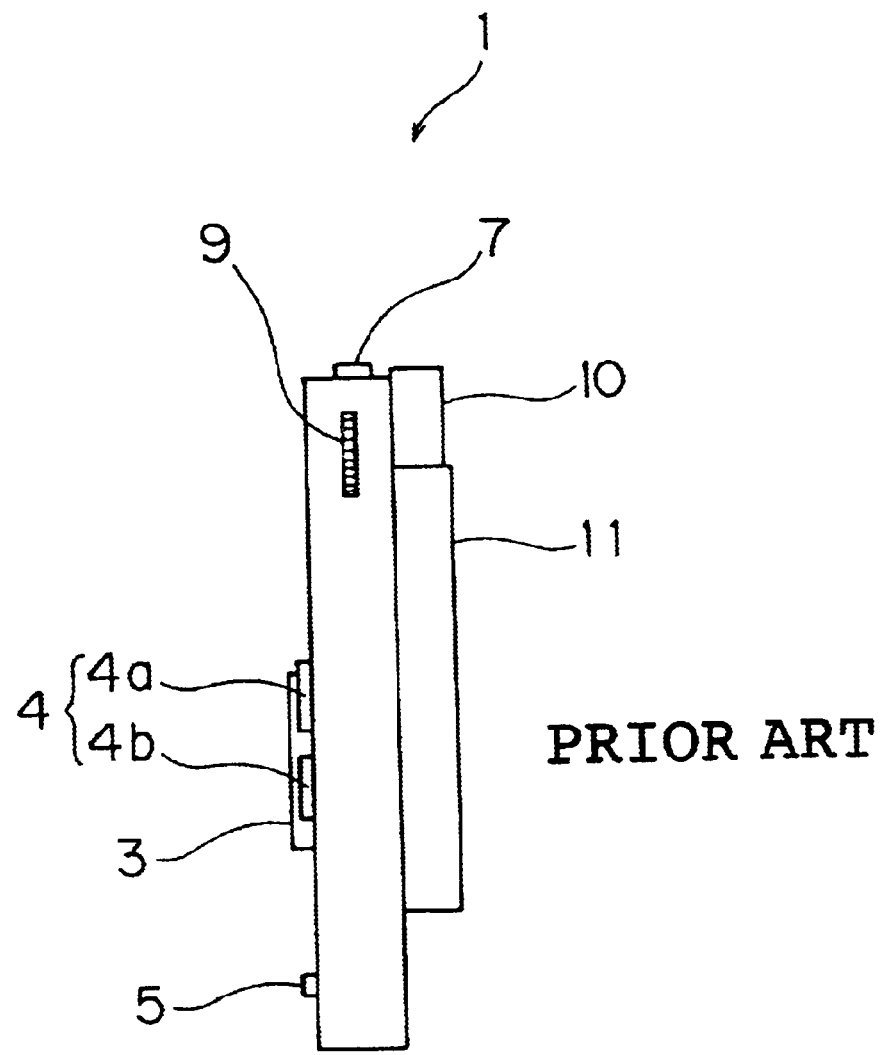
FIG. 28 is a side view of the FIG. 27 seen from an arrow A.

FIG. 24 is a block chart explaining the general circuit between the cartridge and the machine, and FIG. 25 is a block chart explaining a decision memory for the vertical or horizontal pattern, while FIG. 26 is a flow chart explaining a decision program for the vertical or horizontal pattern. The numeral 68 is a decision memory for the vertical or horizontal display as a data memory means and it is established in the program ROM (39) of the cartridge (10). The numeral 69 is a inner ROM which is connected with the inner bus of the system LSI (44). In the memory (68) is a decision data comprising 2-bit capacity to judge the vertical or horizontal game. When the game program datum with the horizontal scrolling is memoried with the ROM (39), the datum "00" is memoried in the memory (68), while in case of the vertical scrolling, the datum "01" is memorized. When the program datum with the horizontal starting and the vertical development to be continued is memorized with the ROM (39), the datum "10" is memorized, while the program datum with the vertical starting and the horizontal development to be continued is memorized with the ROM (39), the datum "11" is memorized accordingly. In the ROM (69) of the machine (29), the decision program for the vertical or horizontal to read the specified address of the program ROM (39) is provided.

When the cartridge (10) is inserted into the game machine (29) and the power is supplied, through the control of the CPU core (49), the initial stage of the program is started, and as a Step S50 the CPU core reads the horizontal or vertical decision datum in the memory (68), whose datum is memoried the specified address of the program ROM (39). In case if the datum shows "00" as a Step S51, a logo mark for horizontal scrolling is shown on the display portion (13) as a Step S52, and the program as explained in FIG. 14~FIG. 17 is performed. When the datum shows "01" as the Step S51, the logo mark for vertical scrolling appears on the display portion (13) as a Step S53, the program shown in FIG. 18~FIG. 21 is performed. In case where the datum shows "10" as the Step S51, the logo mark for horizontal and vertical scrolling which starts by the horizontal scrolling appears on the display portion (13) as a Step S54, while in case where the datum shows the datum "11" as the Step S51, the logo mark for vertical and horizontal scrolling which starts by the vertical scrolling appears on the display portion (13) as a Step S55. After the obtainment of this logo mark, the program as shown in FIG. 14~FIG. 21 is now performed.

The decision memory can be provided separately from the program ROM (39). At the same time, this memory can be also provided by a circuit in stead of using the inner ROM (69).

In this embodiment, as the decision memory (68) is established in the cartridge (10), it is easily recognized whether the cartridge (10) is usable with the game machine (29) immediately, and the player can confirm the mode of the game clearly before starting the game.

The eighth embodiment is now explained with reference to FIG. 6~FIG. 11, FIG. 13 and FIG. 22~FIG. 26.

In this embodiment, a scan register (65) is established in a key interface (56), and similar to the sixth embodiment an operative function memory is established in a saving RAM (40), while similar to the seventh embodiment a decision memory (68) is established in a cartridge (10).

If the datum of the memory (68) shows "00", a logo mark for horizontal scrolling is shown on the display portion (13), and if the datum shows "01", the logo mark for vertical scrolling appears on the display portion (13). Where the datum shows "10", the logo mark for horizontal and vertical scrolling which starts by the horizontal scrolling appears on the display portion (13), while in case where the datum shows the datum "11" as the Step S51, the logo mark for vertical and horizontal scrolling which starts by the vertical scrolling appears on the display portion (13). Each operative function is stored into two operative function memories (66 and 67) in correspondence with each register of the scan register (65). Then, similar to the sixth embodiment, each operative function is allotted properly and the game is performed.

Even by this embodiment, the exact and same result is obtained similar to the Embodiments 6 and 7. In this embodiment, the operative function memories (66 and 67) can be established in the inner RAM (57).

The ninth embodiment is now explained with reference to FIG. 1, FIG. 2 and FIG. 6~FIG. 21.

This embodiment adopts the game machine (12) of the first embodiment in the system of the fifth embodiment. Except the game machine (29), the difference resides where the key top of the shift key (3) is a round cruciform shape and where a set key (4 and 14) as the movement key is positioned apart from the shift key (3). The mechanism of the key switch is exactly same as that adopted in the fifth embodiment.

When a cartridge (10) for the horizontal scrolling game is inserted into the game machine (12), the upper side switch of the shift key (3) functions as the first key switch (301) of the direction indicating key set (30) in the machine (29), and the left side key switch of the shift key (3) functions as the second key switch (302). The lower side key switch of the shift key (3) functions as the third key switch (303), while the right side key switch of the shift key (3) functions as the fourth key (304). The passive moment key (4a) of the set key (4) functions as the tenth key switch (322) of the decision key set (32), while the active moment key (4b) of the key set (4) functions as the ninth key (321) of the decision key set (32).

When the cartridge (10) for the vertical scrolling game is inserted into the game machine (12), the upper side switch of the shift key (3) which is exactly same as the right side key switch in the horizontal display functions as the eighth key switch (314) of the direction indicating key set (31) in the machine (29), and the left side key switch of the shift key (3) functions as the fifth key switch (311). The lower side key switch of the shift key (3) functions as the sixth key switch (312), while the right side key switch of the shift key (3) functions as the seventh key (313). The passive moment key (14a) of the key set (14) functions as the third key switch (303) of the direction indicating key set (30), while the active moment key (14b) of the set key (14) functions as the second key (302) of the direction key set (30).

The tenth embodiment is now explained with reference to FIG. 3, FIG. 6~FIG. 13, FIG. 22 and FIG. 23.

This embodiment adopts the game machine (15) of the second embodiment in the system of the sixth embodiment. The operative function memories (66 and 67) are established in the inner RAM (57) of the machine (15). Except the machine (15), the difference resides where the key top of the shift keys (3 and 17) and the movement key (16) is a round cruciform shape and where a change-over switch (18) is formed in order to change the function of the shift key (3) into that of the movement key (16). The inner mechanism of the key switch is exactly same as shown in FIG. 9~FIG. 11 except the key top.

With regard to the scan register as shown in FIG. 22, the following should be adopted for the same correspondences: the register for the first key switch (301) of the direction indicating key (30) corresponds to the upper side key switch of the shift key (13); the second key switch (302) corresponds to the left side key switch; the third key switch (303) corresponds to the lower side key switch; the fourth key switch (304) corresponds to the right side key switch; the fifth key switch (311) of the direction indicating key set (31) corresponds to the upper side key of the shift key (17); the sixth key switch (312) corresponds to the left side key switch; the seventh key switch (313) corresponds to the lower side key switch; the eighth key switch (314) corresponds the right side key switch; the ninth key switch (321) of the decision key (32) corresponds to the lower side switch key of the movement key (16); and the tenth key switch (322). Thus, when the cartridge (10) for the horizontal scrolling game is inserted into the game machine (15) and the change-over switch (18) is operated for the mode of the horizontal scrolling game, all function data are properly read from the program ROM (39) and transmitted to the horizontal function memory (66) for storing in correspondence with the scan register (65). In the vertical scrolling game case, the change-over switch (18) is operated for the mode of the vertical scrolling game and all function data are transmitted to the vertical function memory (67) accordingly. In the horizontal and vertical processing game case, the switch (18) is properly operated in the mode, and the relative function data are transmitted into the both function memories (66 and 67) in the due course.

The upper side key switch and the left side key switch of the movement key (16) may be used as the reserve keys.

The eleventh embodiment is now explained with reference to FIG. 4 and FIG. 6~FIG. 21.

This embodiment adopts the game machine (19) of the third embodiment in the system of the fifth embodiment.

When the cartridge (10) for the horizontal scrolling game is inserted into the game machine (29), the upper side switch of the shift key set (20) functions as the first key switch (301) of the direction indicating key set (30) in the machine (29), and the left side key switch of the shift key set (20) functions as the second key switch (302). The lower side key switch of the shift key set (20) functions as the third key switch (303), while the right side key switch of the shift key set (20) functions as the fourth key (304). The passive moment key (4a) of the movement key set (21) functions as the tenth key switch (322) of the decision key (32), while the active moment key (4b) of the movement key set (21) functions as the ninth key (321) of the decision key set (32).

When the cartridge (10) for the vertical scrolling game is inserted into the game machine (19), the upper side switch of the shift key (22) functions as the eighth key switch (314) of the direction indicating key set (31) in the machine (29), and the left side key switch of the shift key set (22) functions as the fifth key switch (311). The lower side key switch of the shift key set (22) functions as the sixth key switch (312), while the right side key switch of the shift key set (22) functions as the seventh key (313). The passive moment key (4a) of the movement key set (21) functions as the tenth key switch (322) of the decision key set (32), while the active moment key (4b) of the movement key set (21) functions as the ninth key switch (321) of the decision key (32).

The twelveth embodiment is now explained with reference to FIG. 5 and FIG. 6~FIG. 21.

This embodiment adopts the game machine (24) of the fourth embodiment in the system of the fifth embodiment.

When the cartridge (10) for the horizontal scrolling game is inserted into the game machine (24), the upper side switch (251) of the shift key set (25) functions as the first key switch (301) of the direction indicating key set (30) in the machine (29), and the left side key switch (252) of the shift key set (25) functions as the second key switch (302). The lower side key switch (253) of the shift key (25) functions as the third key switch (303), while the right side key switch (254) of the shift key set (25) functions as the fourth key (304). The upper side key switch (261) of the movement key set (26) functions as the tenth key switch (322) of the decision key set (32), while the lower side key switch (262) of the movement key set (26) functions as the ninth key (321) of the decision key set (32).

When the cartridge (10) for the vertical scrolling game is inserted into the game machine (24), the upper side switch (271) of the shift key set (27) functions as the eighth key switch (314) of the direction indicating key set (31) in the machine (29), and the left side key switch (272) of the shift key (27) functions as the fifth key switch (311). The lower side key switch (273) of the shift key set (27) functions as the sixth key switch (312), while the right side key switch (274) of the shift key set (27) functions as the seventh key (313). The upper side key switch (281) of the movement key set (28) functions as the third key switch (303) of the direction indicating key set (30), while the lower key switch (282) of the movement key set (28) functions as the second key switch (302) of the direction key set (30).

The embodiments 6 and 7 may be also adopted in the system of the embodiments, 1, 3 and 4.

The language of the operative function means the actions of the character in the game for shifting, stoppage, jumping and so on, or it means the function to display and control the character in the game. For example, when the operative function is given to the direction key, the character is to move in the direction of the key.

In the aforesaid descriptions for the game proceedings, the horizontal scrolling game is performed in the horizontal LCD display portion, while the vertical scrolling game is performed in the vertical LCD display portion, but the horizontal game can also proceed in the vertical display while the vertical game can also proceed in the horizontal display. In other words, since any kind of program data such as the horizontal, vertical, horizontal/vertical mixed displays can be obtained.

As explained so far, according to the present invention, plural operative means are provided for the hand-held LCD game machine so that the game can be operated both in lengthwise or sideways position with the proper LCD display portion in compliance with the horizontal, vertical or horizontal/vertical mixed scrolling game. Through the development of this machine, the invention has provided the oblong shape of the LCD display in a smaller size than the before, where the almost square LCD display was unavoidable in prior art. This invention can provide both low cost and the more compact size by minimizing the LCD display.

The plural operative means are positioned in proper places, so that the desirable operability can be obtained in actual play operation with combinations of the machine and the cartridge.

In prior art, in the approximate square display, some unnecessary characters, or background scenes are displayed in addition for the game software. By this invention, such extra displays are not necessary. Therefore, cost reduction of software can be also obtained.

It is further understood by those skilled in the art that the foregoing description is a preferred embodiment of the disclosed matter and that various changes and modifications may be made in the invention without departing from the spirit and scope thereof.

What is claimed is:

1. A hand-held game machine having a horizontal orientation and a vertical orientation, the game machine comprising:
   a game machine housing positionable in the horizontal orientation and the vertical orientation;
   a display screen; and
   first and second operation key-sets;
   wherein the game machine is adapted to receive either a horizontal game play orientation signal or a vertical game play orientation signal;
   wherein a first functionality is assigned to the first operation key-set operated by a first finger of a user of the hand-held game machine in response to receiving the horizontal game play orientation signal;
   wherein a second functionality is assigned to the second operation key-set operated by the first finger of a user of the hand-held game machine in response to receiving the vertical game play orientation signal;
   wherein the first finger operates the same functionality in both the horizontal orientation and the vertical orientation; and
   wherein the first operation key-set is physically separate and distinct from the second operation key-set.

2. A method for assigning key-set functionality to a hand-held game machine, comprising:
   receiving one of a horizontal game play orientation signal or a vertical game play orientation signal;
   assigning a first functionality to a first operation key-set operated by a first finger of a user of the hand-held game machine in response to receiving the horizontal game play orientation signal; and
   assigning the first functionality to a second operation key-set operated by the first finger of a user of the hand-held game machine in response to receiving the vertical game play orientation signal, whereby the first finger operates the same functionality in both a horizontal operating position and a vertical operating position of the hand-held game machine;

wherein the first operation key-set is physically separate and distinct from the second operation key-set.

3. The method of claim 2 wherein the receiving step further comprises providing the game play orientation signal from a memory cartridge.

4. The method of claim 2 further comprising the steps of:

assigning a second functionality to a third operation key-set operated by a second finger of a user, responsive to receiving the horizontal indication signal;

assigning the second functionality to the first operation key-set operated by the second finger of the user, responsive to receiving the vertical indication signal, whereby the second finger controls the same functionality in both the horizontal and vertical operating positions of the hand-help game machine.

5. The method of claim 4 wherein the first operation key-set is operable when either of the horizontal game play orientation signal or the vertical game play orientation signal is received in the receiving step.

6. A hand-held game machine comprising:

means for receiving one of a horizontal game play orientation signal or a vertical game play orientation signal;

means for assigning a first functionality to a first operation key-set operated by a first finger of a user of the hand-held game machine in response to receiving the horizontal game play orientation signal; and means for assigning the first functionality to a second operation key-set operated by the first finger of a user of the hand-held game machine in response to receiving the vertical indication signal, whereby the first finger operates the same functionality in both a horizontal operating position and a vertical operating position of the hand-held game machine;

wherein the first operation key-set is not directly connected to the second operation key-set.

7. A game machine comprising:

means for receiving one of a horizontal game play orientation signal or a vertical game play orientation signal;

means for assigning a first functionality to a first operation key-set operated by a first finger of a user of the hand-held game machine in response to the horizontal game play orientation signal; and means for assigning the first functionality to a second operation key-set operated by the first finger of a user of the hand-held game machine in response to receiving the vertical game play orientation signal and assigning a second functionality to the first operation key-set, whereby the first finger operates the same functionality in both a horizontal operating position and a vertical operating position of the hand-held game machine;

wherein the first operation key-set is physically separate and distinct from the second operation key-set.

8. The apparatus of claim 7 wherein the game machine further comprises a removable cartridge providing the game play orientation signal.

9. The method of claim 7 further comprising means for assigning a second functionality to a third operation key-set operated by a second finger of a user, responsive to receiving the horizontal indication signal.

10. The method of claim 7 wherein the first operation key-set is operable when either of the horizontal game play orientation signal or the vertical game play orientation signal is received in the receiving step.

11. A game machine comprising:

receiving circuit that receives one of a horizontal game play orientation signal or a vertical game play orientation signal;

functionality assigning circuit that assigns a first functionality to a first operation key-set operated by a first finger of a user of the hand-held game machine in response to the horizontal game play orientation signal; and second functionality assigning circuit that assigns the first functionality to a second operation key-set operated by the first finger of a user of the hand=held game machine in response to the vertical game play orientation signal, whereby the first finger operates the same functionality in both a horizontal operating position and a vertical operating position on the hand-held game machine;

wherein the first operation key-set is not directly attached to the second operation key-set.

12. A method of assigning key-set functionality to a hand-held game machine, comprising:

receiving one of a first game play orientation signal or a second game play orientation signal;

assigning a first functionality to a first operation key-set operated by a first finger of a user of the hand-held game machine in response to receiving the first game play orientation signal; and assigning the first functionality to a second operation key-set operated by the first finger of a user of the hand-held game machine in response to receiving the second game play orientation signal and assigning a second functionality to the first operation key-set, whereby the first finger operates the same functionality in both the first operating position and the second operating position of the hand-held game machine;

second functionality assigning circuit that assigns the first functionality to a second operation key-set operated by the first finger of a user of the hand-held game machine in response to the vertical game play orientation signal, whereby the first finger operates the same functionality in both a horizontal operating position and a vertical operating position of the handheld game machine;

wherein the first operation key-set is not directly connected to the second operation key-set.

* * * * *